United States Patent
Ebata

(10) Patent No.: US 12,507,994 B2
(45) Date of Patent: Dec. 30, 2025

(54) ULTRASOUND DIAGNOSTIC APPARATUS AND CONTROL METHOD OF ULTRASOUND DIAGNOSTIC APPARATUS

(71) Applicant: FUJIFILM Corporation, Tokyo (JP)

(72) Inventor: Tetsurou Ebata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 183 days.

(21) Appl. No.: 18/159,955

(22) Filed: Jan. 26, 2023

(65) Prior Publication Data

US 2023/0172583 A1    Jun. 8, 2023

Related U.S. Application Data

(63) Continuation of application No. PCT/JP2021/011036, filed on Mar. 18, 2021.

(30) Foreign Application Priority Data

Aug. 27, 2020    (JP) .................. 2020-143198

(51) Int. Cl.
*A61B 8/00*    (2006.01)
*G02B 27/01*    (2006.01)

(52) U.S. Cl.
CPC ............ *A61B 8/462* (2013.01); *A61B 8/4263* (2013.01); *A61B 8/463* (2013.01); *A61B 8/5207* (2013.01);
(Continued)

(58) Field of Classification Search
CPC ....... A61B 8/08; A61B 8/4245; A61B 8/4263; A61B 8/462; A61B 8/463; A61B 8/469;
(Continued)

(56) References Cited

U.S. PATENT DOCUMENTS

| 5,660,179 A * | 8/1997 | Matsumoto ............ A61B 8/08 600/440 |
| 2007/0239004 A1 | 10/2007 | Kakee et al. |

(Continued)

FOREIGN PATENT DOCUMENTS

| JP | H09-201358 A | 8/1997 |
| JP | 2008-086742 A | 4/2008 |

(Continued)

OTHER PUBLICATIONS

Takamatsu JP 2014121434 (Year: 2014).*
(Continued)

*Primary Examiner* — Brooke Lyn Klein
(74) *Attorney, Agent, or Firm* — Studebaker Brackett PLLC

(57) ABSTRACT

There are provided an ultrasound diagnostic apparatus and a control method of the ultrasound diagnostic apparatus which can check a scanned region while looking at an ultrasound probe. A scanned region mask generation unit of a diagnostic apparatus main body generates a scanned region mask indicating a scanned region on the basis of a visual field image acquired by a camera of an HMD, a determination result by a scanning determination unit as to whether the ultrasound probe is performing a scan, and a scanning position of the ultrasound probe detected by a scanning position detection unit, and the generated scanned region mask is transmitted from the diagnostic apparatus main body to the HMD and is displayed on an HMD-side monitor.

17 Claims, 13 Drawing Sheets

(52) U.S. Cl.
CPC .. *G02B 27/0172* (2013.01); *G02B 2027/0138* (2013.01); *G02B 2027/014* (2013.01); *G02B 2027/0141* (2013.01); *G02B 2027/0178* (2013.01)

(58) Field of Classification Search
CPC  A61B 8/5207; A61B 8/54; G02B 2027/0138; G02B 2027/014; G02B 2027/0141; G02B 2027/0178; G02B 27/0172
See application file for complete search history.

(56) References Cited

U.S. PATENT DOCUMENTS

| | | | |
|---|---|---|---|
| 2007/0239146 A1* | 10/2007 | Wang | A61N 5/0616 606/9 |
| 2016/0100821 A1* | 4/2016 | Eggers | A61B 8/4405 600/424 |
| 2016/0191887 A1 | 6/2016 | Casas | |
| 2018/0168546 A1* | 6/2018 | Ebata | A61B 8/4245 |
| 2019/0117190 A1* | 4/2019 | Djajadiningrat | G06T 19/006 |
| 2019/0239850 A1 | 8/2019 | Dalvin et al. | |
| 2021/0298720 A1 | 9/2021 | Karasawa et al. | |
| 2021/0361261 A1 | 11/2021 | Noguchi | |

FOREIGN PATENT DOCUMENTS

| | | | |
|---|---|---|---|
| JP | 2009-225905 | A | 10/2009 |
| JP | 2012-245205 | A | 12/2012 |
| JP | 5410629 | B1 * | 2/2014 |
| JP | 2014121434 | A * | 7/2014 |
| WO | 2020/149092 | A1 | 7/2020 |
| WO | 2020/166143 | A1 | 8/2020 |

OTHER PUBLICATIONS

Kenji JP5410629 (Year: 2014).*
International Search Report issued in PCT/JP2021/011036; mailed May 18, 2021.
International Preliminary Report on Patentability and Written Opinion issued in PCT/JP2021/011036; issued Feb. 28, 2023.
The extended European search report issued by the European Patent Office on Dec. 11, 2023, which corresponds to European Patent Application No. 21860832.1-1126 and is related to U.S. Appl. No. 18/159,955.

* cited by examiner

ULTRASOUND DIAGNOSTIC APPARATUS AND CONTROL METHOD OF ULTRASOUND DIAGNOSTIC APPARATUS

CROSS-REFERENCE TO RELATED APPLICATIONS

This application is a Continuation of PCT International Application No. PCT/JP2021/011036 filed on Mar. 18, 2021, which claims priority under 35 U.S.C. § 119(a) to Japanese Patent Application No. 2020-143198 filed on Aug. 27, 2020. The above applications are hereby expressly incorporated by reference, in its entirety, into the present application.

BACKGROUND OF THE INVENTION

1. Field of the Invention

The present invention relates to an ultrasound diagnostic apparatus and a control method of the ultrasound diagnostic apparatus which can check a scanned region by an ultrasound probe.

2. Description of the Related Art

In the related art, pressure ulcers, edema that is a kind of phlebitis, and the like are evaluated using an ultrasound diagnostic apparatus. A wound of a subject often extends over a wide area, and an ultrasound image is generally captured by performing a scan over a plurality of rows while sliding an ultrasound probe along a plurality of directions.

In this manner, since a wide range is scanned while siding the ultrasound probe along a plurality of rows, an excessive overlap or non-scanned gap region may occur between adjacent scanned regions, and there is a risk of an erroneous evaluation for pressure ulcers, edema that is a kind of phlebitis, and the like.

JP2009-225905A, JP1997-201358A (JP-H09-201358A), JP2008-86742A, and JP2012-245205A disclose an ultrasound device that can allow a user to check a scanned region by an ultrasound probe.

SUMMARY OF THE INVENTION

In the ultrasound device disclosed in JP2009-225905A, JP1997-201358A (JP-H09-201358A), JP2008-86742A, and JP2012-245205A, a position sensor is mounted on the ultrasound probe, and the scanned region is specified on the basis of positional information of the ultrasound probe detected by the position sensor, and is displayed on a display unit of the ultrasound device. The user can check the scanned region by viewing the display unit of the ultrasound device.

However, the user who is capturing an ultrasound image while keeping the ultrasound probe in contact with the body surface of the subject has to view the display unit of the ultrasound device each time the scanned region is checked. In particular, in a case where an examination of pressure ulcers, edema that is a kind of phlebitis, and the like is performed, a wide range is scanned while sliding the ultrasound probe, and therefore, it is desirable to intuitively check the scanned region while looking at the ultrasound probe.

Further, since examinations of pressure ulcers, edema that is a kind of phlebitis, and the like are often performed at home, and portable or handheld compact ultrasound devices are used, in a case where the scanned region is displayed together with the ultrasound image on the display unit of the ultrasound device, there is a problem that the visibility is reduced. Separately from the ultrasound device, using a dedicated monitor for displaying the scanned region impairs the operability, and is impractical.

The present invention has been made in order to solve such a problem in the related art, and an object of the invention is to provide an ultrasound diagnostic apparatus and a control method of the ultrasound diagnostic apparatus which can check a scanned region while looking at the ultrasound probe.

In order achieve the object, an ultrasound diagnostic apparatus according to an aspect of the present invention includes an ultrasound probe; and a head-mounted display, in which the head-mounted display includes a camera that acquires a visual field image including the ultrasound probe that performs a scan along a body surface of a subject, and a head-mounted display-side monitor, and the ultrasound diagnostic apparatus includes a scanning determination unit that determines whether or not the ultrasound probe is performing a scan, a scanning position detection unit that detects a scanning position of the ultrasound probe by analyzing the visual field image, and a scanned region mask generation unit that generates a scanned region mask indicating a scanned region on the basis of the visual field image, a determination result by the scanning determination unit, and the scanning position detected by the scanning position detection unit, and displays the scanned region mask on the head-mounted display-side monitor.

The ultrasound diagnostic apparatus can include a diagnostic apparatus main body that is connected to the ultrasound probe and the head-mounted display, and the scanning determination unit, the scanning position detection unit, and the scanned region mask generation unit can be included in the diagnostic apparatus main body.

Alternatively, the scanning determination unit, the scanning position detection unit, and the scanned region mask generation unit can be included in the head-mounted display.

The scanning determination unit can be included in the ultrasound probe, and the scanning position detection unit and the scanned region mask generation unit can be included in the head-mounted display.

It is preferable that the ultrasound diagnostic apparatus further includes an image generation unit that generates an ultrasound image by the ultrasound probe performing a scan along the body surface of the subject.

The scanning determination unit can determine whether or not the ultrasound probe is performing a scan by analyzing the ultrasound image.

The scanning determination unit can determine whether or not the ultrasound probe is performing a scan by analyzing the visual field image.

The ultrasound probe may include a pressure sensor, and the scanning determination unit may determine whether or not the ultrasound probe is performing a scan on the basis of a pressure detected by the pressure sensor.

The ultrasound diagnostic apparatus can further include an input unit that is used for a user to input whether to perform a scan of the ultrasound probe, and the scanning determination unit can determine that the ultrasound probe is performing a scan in a case where the user has input, via the input unit, to perform a scan of the ultrasound probe.

It is preferable that the scanning position detection unit detects the scanning position by recognizing a distal end portion of the ultrasound probe in the visual field image.

It is preferable that the scanned region mask generation unit converts, on the basis of movement between the visual field image of a previous frame and the visual field image of a current frame, the scanned region mask in the previous frame, and adds the scanning position detected by the scanning position detection unit to generate the scanned region mask in the current frame.

The ultrasound diagnostic apparatus can further include a region determination unit that determines a pressure ulcer region and an edema region in a wound by analyzing the ultrasound image, and body surface portions of the subject corresponding to the pressure ulcer region and the edema region determined by the region determination unit can be displayed on the head-mounted display-side monitor.

The ultrasound diagnostic apparatus can further include a diagnostic apparatus main body that is connected to the ultrasound probe and the head-mounted display and has a main body-side monitor, in which the ultrasound image is stored in association with the scanning position detected by the scanning position detection unit, and in a case where any position on the visual field image displayed on the main body-side monitor is designated by the user, the ultrasound image stored with the designated position as the scanning position is displayed on the main body-side monitor.

The ultrasound diagnostic apparatus can further include a positional relationship determination unit that determines a positional relationship between the scanning position detected by the scanning position detection unit and the scanned region indicated by the scanned region mask, in which in a case where the positional relationship determination unit determines that the scanning position overlaps the scanned region by a width exceeding a predetermined threshold value or a gap is generated between the scanning position and the scanned region, a notification is issued to a user.

The ultrasound probe may include an angle sensor that detects an angle of the ultrasound probe, and in a case where the angle of the ultrasound probe detected by the angle sensor is changed by a predetermined threshold value or more during the scan of the ultrasound probe, a notification may be issued to a user.

The head-mounted display-side monitor can be a transparent monitor arranged in a visual field of the head-mounted display, and a user can directly view the ultrasound probe that performs a scan along the body surface of the subject, through the head-mounted display-side monitor.

Alternatively, the visual field image can be displayed on the head-mounted display-side monitor, a user can observe the visual field image displayed on the head-mounted display-side monitor, and the scanned region mask can be displayed on the head-mounted display-side monitor by being superimposed on the visual field image.

A control method of an ultrasound diagnostic apparatus according to an aspect of the present invention includes acquiring a visual field image including an ultrasound probe that performs a scan along a body surface of a subject by a camera of a head-mounted display; determining whether or not the ultrasound probe is performing a scan; detecting a scanning position of the ultrasound probe by analyzing the visual field image; and generating a scanned region mask indicating a scanned region on the basis of the visual field image, a determination result as to whether the ultrasound probe is performing a scan, and the detected scanning position, and displaying the scanned region mask on a head-mounted display-side monitor.

According to the present invention, the head-mounted display includes a camera that acquires a visual field image including the ultrasound probe that performs a scan along a body surface of a subject, and a head-mounted display-side monitor, and the ultrasound diagnostic apparatus includes a scanning determination unit that determines whether or not the ultrasound probe is performing a scan, a scanning position detection unit that detects a scanning position of the ultrasound probe by analyzing the visual field image, and a scanned region mask generation unit that generates a scanned region mask indicating a scanned region on the basis of the visual field image, a determination result by the scanning determination unit, and the scanning position detected by the scanning position detection unit, and displays the scanned region mask on the head-mounted display-side monitor. Therefore, it is possible to check the scanned region while looking at the ultrasound probe.

DESCRIPTION OF THE PREFERRED EMBODIMENTS

Hereinafter, embodiments of the invention will be described with reference to the accompanying drawings.

The description of configuration requirements described below is given on the basis of the representative embodiment of the present invention, but the present invention is not limited to such an embodiment.

In the present specification, a numerical range represented using "to" means a range including the numerical values before and after "to" as a lower limit value and an upper limit value.

The term "transparent" means that a light transmittance is at least 40% or more, preferably 75% or more, more preferably 80% or more, still more preferably 90% or more in a visible light wavelength range with a wavelength of 400 to 800 nm. The light transmittance is measured using "Plastics-Determination of total luminous transmittance and reflectance" defined in JIS K 7375:2008.

In the present specification, the terms "same" and "identical" include an error range generally allowed in the technical field.

Figure 1:
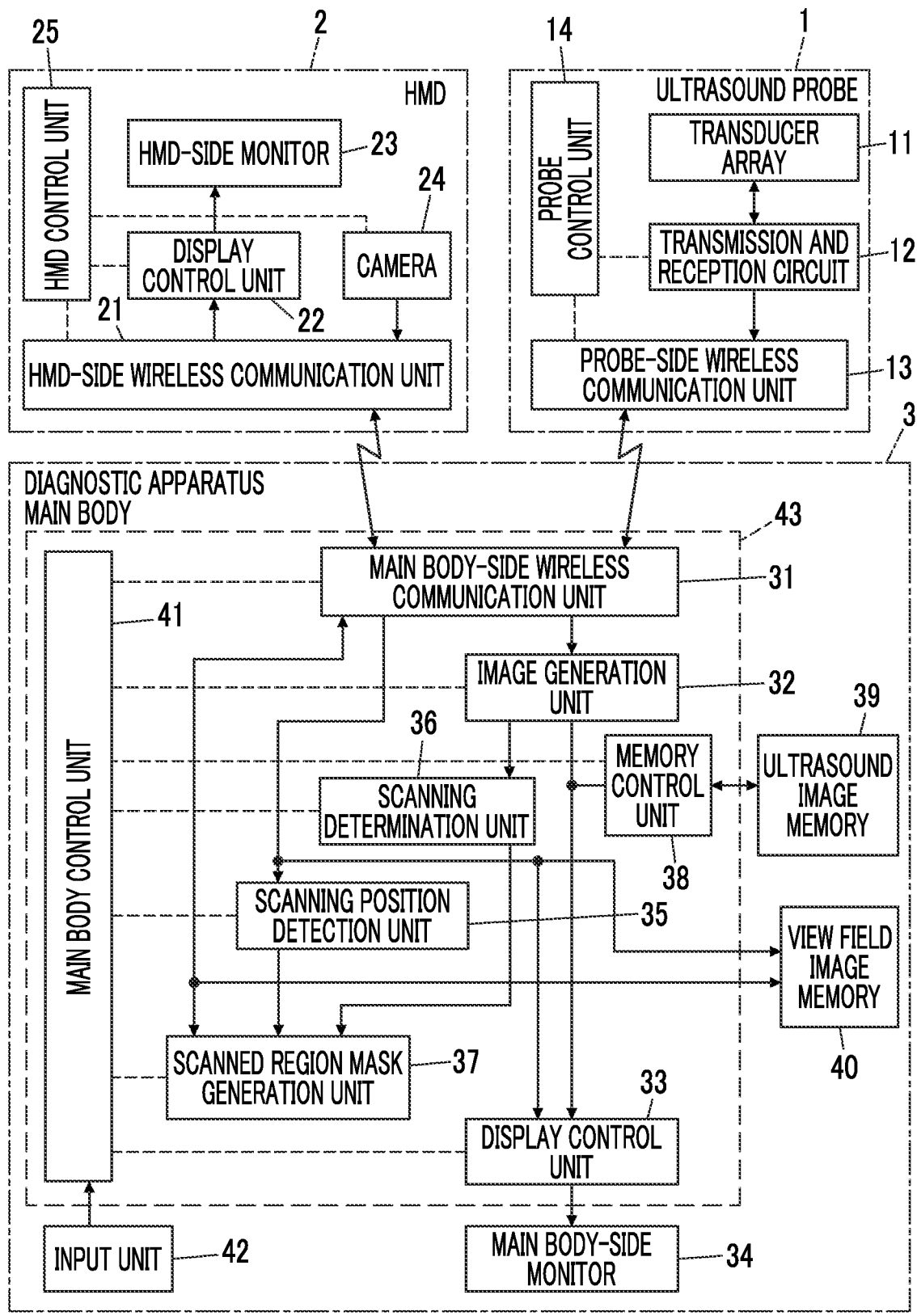
FIG. 1 is a block diagram illustrating a configuration of an ultrasound diagnostic apparatus according to a first embodiment of the present invention.

FIG. 1 illustrates a configuration of an ultrasound diagnostic apparatus according to a first embodiment of the present invention. The ultrasound diagnostic apparatus includes an ultrasound probe 1, a head-mounted display (HMD) 2, and a diagnostic apparatus main body 3. The ultrasound probe 1 and the diagnostic apparatus main body 3 are connected to each other by wireless communication, and the HMD 2 and the diagnostic apparatus main body 3 are connected to each other by wireless communication.

The ultrasound probe 1 has a transducer array 11, and a transmission and reception circuit 12 and a probe-side wireless communication unit 13 are sequentially connected to the transducer array 11. A probe control unit 14 is connected to the transmission and reception circuit 12 and the probe-side wireless communication unit 13.

The HMD 2 includes an HMD-side wireless communication unit 21, and a display control unit 22 and a head-mounted display-side monitor (HMD-side monitor) 23 are sequentially connected to the HMD-side wireless communication unit 21. Further, the HMD 2 includes a camera 24, and the camera 24 is connected to the HMD-side wireless communication unit 21. An HMD control unit 25 is connected to the HMD-side wireless communication unit 21, the display control unit 22, the HMD-side monitor 23, and the camera 24.

The diagnostic apparatus main body 3 includes a main body-side wireless communication unit 31, and an image generation unit 32, a display control unit 33, and a main body-side monitor 34 are sequentially connected to the main body-side wireless communication unit 31. Further, a scanning position detection unit 35 and the display control unit 33 are connected to the main body-side wireless communication unit 31, a scanning determination unit 36 is connected to the image generation unit 32, and a scanned region mask generation unit 37 is connected to the scanning position detection unit 35 and the scanning determination unit 36.

The scanned region mask generation unit 37 is connected to the main body-side wireless communication unit 31.

An ultrasound image memory 39 is connected to the image generation unit 32 via a memory control unit 38, and a visual field image memory 40 is connected to the main body-side wireless communication unit 31 and the scanned region mask generation unit 37.

A main body control unit 41 is connected to the main body-side wireless communication unit 31, the image generation unit 32, the display control unit 33, the scanning position detection unit 35, the scanning determination unit 36, the scanned region mask generation unit 37, and the memory control unit 38, and an input unit 42 is connected to the main body control unit 41.

The main body-side wireless communication unit 31, the image generation unit 32, the display control unit 33, the scanning position detection unit 35, the scanning determination unit 36, the scanned region mask generation unit 37, the memory control unit 38, and the main body control unit 41 constitute a main body-side processor 43.

The main body-side wireless communication unit 31 and the probe-side wireless communication unit 13 are connected to each other by wireless communication, and the main body-side wireless communication unit 31 and the HMD-side wireless communication unit 21 are connected to each other by wireless communication.

The transducer array 11 of the ultrasound probe 1 has a plurality of ultrasonic transducers arranged in a one-dimensional or two-dimensional manner. According to a drive signal supplied from the transmission and reception circuit 12, each of the transducers transmits an ultrasonic wave and receives a reflected wave from the subject to output an analog reception signal. For example, each transducer is configured by forming electrodes at both ends of a piezoelectric body consisting of piezoelectric ceramic represented by lead zirconate titanate (PZT), a polymer piezoelectric element represented by poly vinylidene di fluoride (PVDF), piezoelectric single crystal represented by lead magnesium niobate-lead titanate (PMN-PT), or the like.

Figure 2:
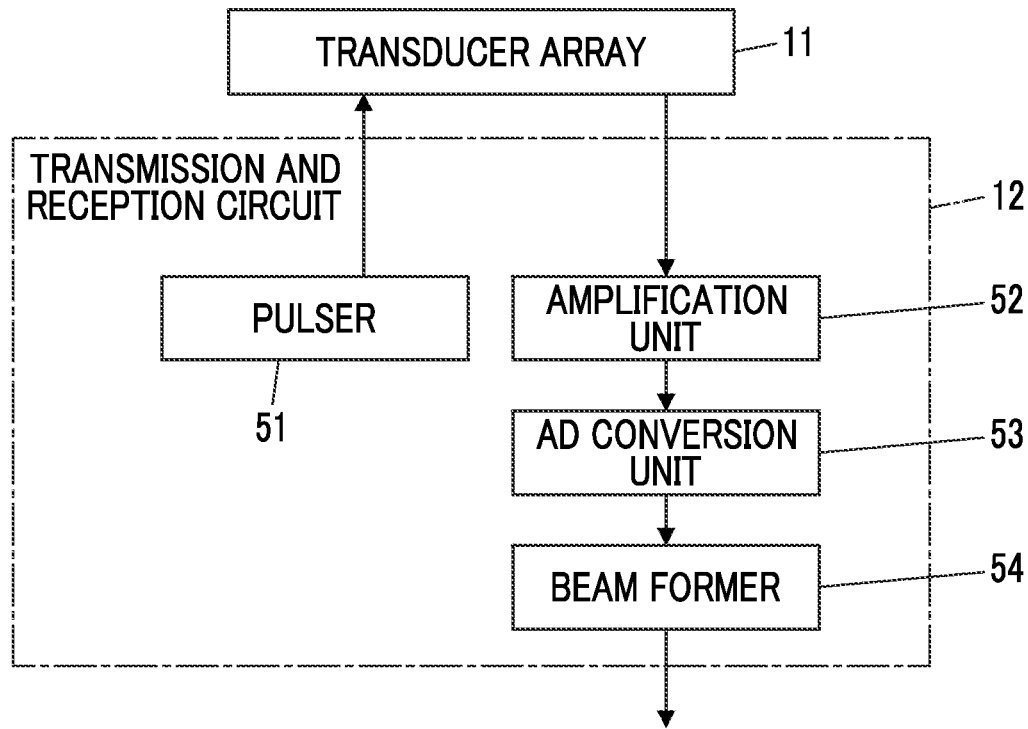
FIG. 2 is a block diagram illustrating an internal configuration of a transmission and reception circuit in the first embodiment.

The transmission and reception circuit 12 causes the transducer array 11 to transmit the ultrasonic wave and generates a sound ray signal on the basis of a reception signal acquired by the transducer array 11, under the control of the probe control unit 14. As illustrated in FIG. 2, the transmission and reception circuit 12 has a pulser 51 connected to the transducer array 11, and an amplification unit 52, an analog digital (AD) conversion unit 53, and a beam former 54 that are sequentially connected in series to the transducer array 11.

The pulser 51 includes, for example, a plurality of pulse generators, and the pulser 51 adjusts the amount of delay of each drive signal so that ultrasonic waves transmitted from the plurality of transducers of the transducer array 11 form an ultrasound beam on the basis of a transmission delay pattern selected according to the control signal from the probe control unit 14, and supplies the obtained signals to the plurality of transducers. Thus, in a case where a pulsed or continuous-wave voltage is applied to the electrodes of the transducers of the transducer array 11, the piezoelectric body expands and contracts to generate pulsed or continuous-wave ultrasonic waves from each transducer. From the combined wave of these ultrasonic waves, an ultrasound beam is formed.

The transmitted ultrasound beam is reflected by a target, for example, a site of the subject, and the ultrasound echo propagates toward the transducer array 11 of the ultrasound probe 1. The ultrasound echo propagating toward the transducer array 11 in this manner is received by each transducer constituting the transducer array 11. In this case, each transducer constituting the transducer array 11 expands and contracts by receiving the propagating ultrasound echo to generate a reception signal that is an electric signal, and outputs the reception signal to the amplification unit 52.

The amplification unit 52 amplifies the signals input from each transducer constituting the transducer array 11, and transmits the amplified signals to the AD conversion unit 53. The AD conversion unit 53 converts the signal transmitted from the amplification unit 52 into digital reception data, and transmits the reception data to the beam former 54. The beam former 54 performs so-called reception focusing processing in which addition is performed by giving delays to respective pieces of the reception data converted by the AD conversion unit 53 according to a sound speed distribution or a sound speed set on the basis of a reception delay pattern selected according to the control signal from the probe control unit 14. Through the reception focusing processing, a sound ray signal in which each piece of the reception data converted by the AD conversion unit 53 is phased and added and the focus of the ultrasound echo is narrowed is acquired.

The probe-side wireless communication unit 13 includes an antenna for transmitting and receiving radio waves, modulates a carrier on the basis of the sound ray signal generated by the transmission and reception circuit 12, and generates a transmission signal representing the sound ray signal. The probe-side wireless communication unit 13 transmits radio waves from the antenna by supplying the transmission signals generated in this manner to the antenna, and sequentially and wirelessly transmits the sound ray signal to the main body-side wireless communication unit 31 of the diagnostic apparatus main body 3.

The probe control unit 14 controls each unit of the ultrasound probe 1 on the basis of a control program and the like stored in advance. Although not illustrated, a probe-side storage unit is connected to the probe control unit 14. The probe-side storage unit stores a control program and the like of the ultrasound probe 1. As the probe-side storage unit, for example, a flash memory, a random access memory (RAM), a Secure Digital card (SD card), a solid state drive (SSD), and the like can be used.

Although not illustrated, a battery is built in the ultrasound probe 1, and power is supplied from the battery to each circuit of the ultrasound probe 1.

Figure 3:
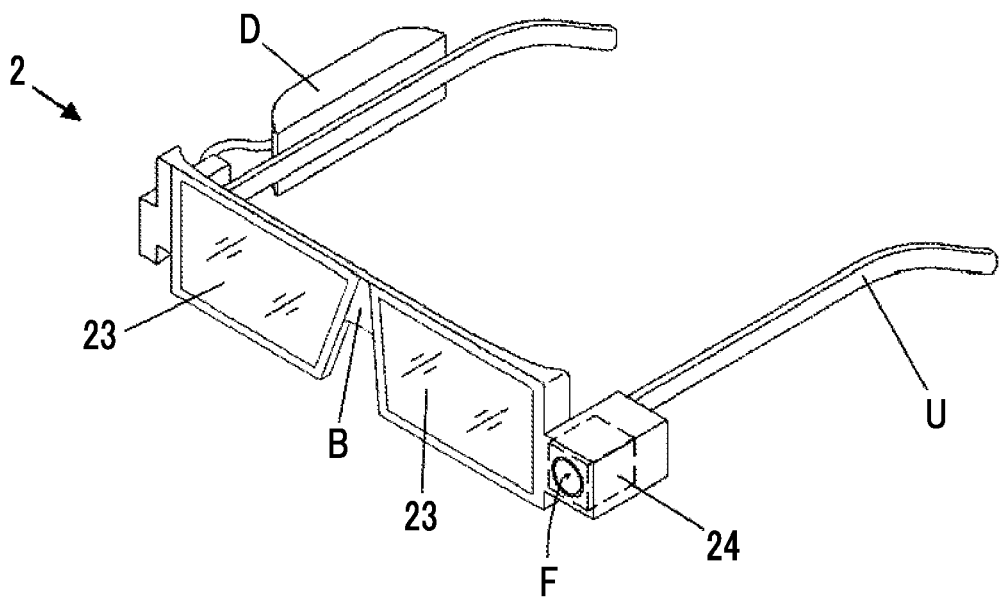
FIG. 3 is a perspective view illustrating a head-mounted display in the first embodiment.

The HMD 2 is a display device that is worn on the user's head and is visually recognized by the user, is also called smart glasses, and has a so-called eyeglass-like shape as illustrated in FIG. 3. The HMD 2 includes a pair of left and right transparent HMD-side monitors 23 arranged within the visual field of the HMD 2. The pair of HMD-side monitors 23 is connected to a bridge portion B, and a temple portion U is connected to an end portion of each of the HMD-side monitors 23. For example, the HMD 2 is fixed to the user's head by hooking the bridge portion B on the user's nose and hooking two temple portions U on the user's ears. In this case, the pair of HMD-side monitors 23 faces the right eye and left eye of the user.

The camera 24 in which an imaging lens F is arranged on the front surface is attached to a connection portion between the HMD-side monitor 23 and the temple portion U that are on the left side of the user in a state where the user is wearing the HMD 2. A housing portion D in which various circuits or the like required for the operation of the HMD 2 are housed is arranged on the temple portion U connected to the HMD-side monitor 23 that is on the right side of the user.

The HMD-side wireless communication unit 21 illustrated in FIG. 1 includes an antenna for transmitting and receiving radio waves, receives the transmission signal representing a scanned region mask M transmitted from the main body-side wireless communication unit 31 of the diagnostic apparatus main body 3, and demodulates the received transmission signals to send image data of the scanned region mask M to the display control unit 22, under the control of the HMD control unit 25.

Further, the HMD-side wireless communication unit 21 modulates the carrier on the basis of image signal of a visual field image C acquired by the camera 24, generates a transmission signal representing the visual field image C, and transmits the radio waves from the antenna to wirelessly transmit the visual field image C to the main body-side wireless communication unit 31 of the diagnostic apparatus main body 3.

Figure 4:
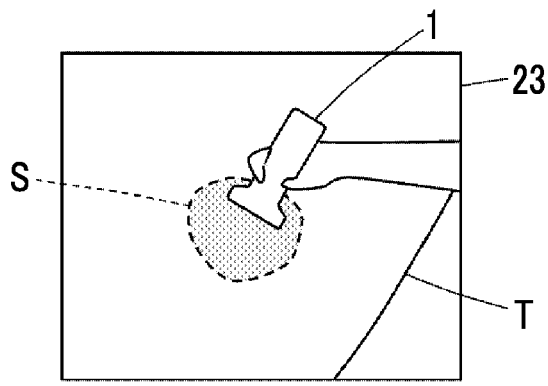
FIG. 4 is a diagram illustrating an example of a forward visual field viewed through an HMD-side monitor.

The HMD-side monitor 23 is for displaying the scanned region mask M under the control of the display control unit 22, and has transparency for securing the visual field of the user in a state where the user is wearing the HMD 2. Therefore, the user can check the scanned region mask M displayed on the HMD-side monitor 23 while viewing the forward visual field through the HMD-side monitor 23. FIG. 4 illustrates a subject T and the ultrasound probe 1 that is in contact with the surface of a wound S of the subject T, which are viewed by the user through the HMD-side monitor 23.

Figure 5:
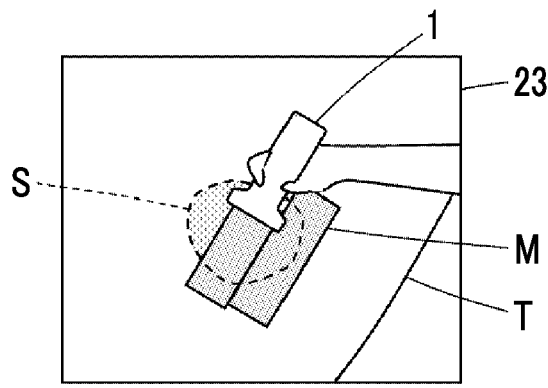
FIG. 5 is a diagram illustrating a head-mounted display-side monitor on which a scanned region mask is displayed.

The display control unit 22 performs predetermined processing on the image data of the scanned region mask M sent from the HMD-side wireless communication unit 21, and displays the scanned region mask M on the HMD-side monitor 23, under the control of the HMD control unit 25. FIG. 5 illustrates a state in which the scanned region mask M is displayed on the HMD-side monitor 23 illustrated in FIG. 4.

The camera 24 captures an image of the forward side through the imaging lens F to acquire the visual field image C including the ultrasound probe 1 that performs a scan along the body surface of the subject T. An image sensor (not illustrated) that acquires a visual field image signal as the analog signal, an analog signal processing circuit (not illustrated) that amplifies the visual field image signal acquired by the image sensor and converts the visual field image signal into the digital signal, and a digital signal processing circuit (not illustrated) that performs various kinds of correction such as gain on the converted digital signal to generate the visual field image C are built in the camera 24. The camera 24 sends the generated visual field image C to the HMD-side wireless communication unit 21. The visual field image C sent to the HMD-side wireless communication unit 21 is wirelessly transmitted to the diagnostic apparatus main body 3 by the HMD-side wireless communication unit 21.

The HMD control unit 25 controls each unit of the HMD 2 on the basis of a control program and the like stored in advance.

Although not illustrated, an HMD-side storage unit is connected to the HMD control unit 25. The HMD-side storage unit stores a control program and the like of the HMD 2. As the HMD-side storage unit, for example, a flash memory, a RAM, an SD card, an SSD, and the like can be used.

Although not illustrated, a battery is built in the HMD 2, and power is supplied from the battery to each circuit of the HMD 2.

The main body-side wireless communication unit 31 of the diagnostic apparatus main body 3 includes an antenna for transmitting and receiving radio waves, receives the transmission signal representing the sound ray signal transmitted from the probe-side wireless communication unit 13 of the ultrasound probe 1 and the transmission signal representing the visual field image C transmitted from the HMD-side wireless communication unit 21 of the HMD 2 via the antenna, and demodulates the received transmission signals to output the sound ray signal and the visual field image C, under the control of the main body control unit 41. The main body-side wireless communication unit 31 sends the sound ray signal to the image generation unit 32, and sends the visual field image C to the scanning position detection unit 35 and the visual field image memory 40.

Further, the main body-side wireless communication unit 31 modulates the carrier on the basis of the image signal of the scanned region mask M generated by the scanned region mask generation unit 37, generates a transmission signal representing the scanned region mask M, and transmits the radio waves from the antenna to wirelessly transmit the scanned region mask M to HMD-side wireless communication unit 21 of the HMD 2.

As the modulation method of the carrier in the probe-side wireless communication unit 13 of the ultrasound probe 1, the HMD-side wireless communication unit 21 of the HMD 2, and the main body-side wireless communication unit 31 of the diagnostic apparatus main body 3, amplitude shift keying (ASK), phase shift keying (PSK), quadrature phase shift keying (QPSK), 16 quadrature amplitude modulation (16QAM), or the like can be used.

The wireless communication of the probe-side wireless communication unit 13 and the HMD-side wireless communication unit 21 with the main body-side wireless communication unit 31 can be performed in accordance with communication standards for mobile communication such as 5th generation mobile communication system (5G) and 4th generation mobile communication system (4G), and communication standards for short-range wireless communication such as WiFi (registered trademark), Bluetooth (registered trademark), and ultra wideband (UWB) communication system.

Figure 6:
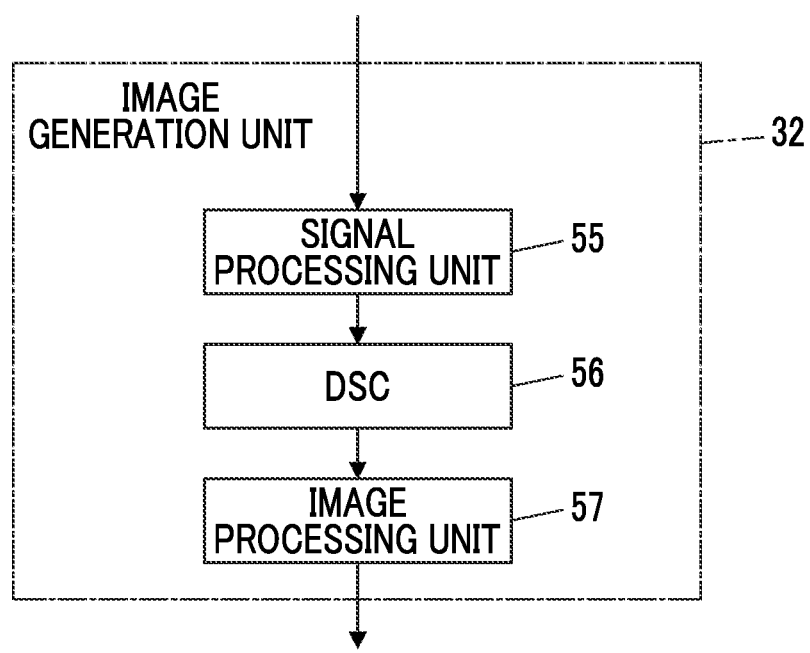
FIG. 6 is a block diagram illustrating an internal configuration of an image generation unit in the first embodiment.

As illustrated in FIG. 6, the image generation unit 32 of the diagnostic apparatus main body 3 has a configuration in which a signal processing unit 55, a digital scan converter (DSC) 56, and an image processing unit 57 are sequentially connected in series.

The signal processing unit 55 generates an ultrasound image signal (B-mode image signal), which is tomographic image information regarding tissues inside the subject T, by performing, on the sound ray signal sent from the main body-side wireless communication unit 31, correction of the attenuation due to the distance according to the depth of the reflection position of the ultrasonic wave and then performing envelope detection processing.

The DSC 56 converts (raster conversion) the ultrasound image signal generated by the signal processing unit 55 into an image signal according to a normal television signal scanning method.

The image processing unit 57 performs various kinds of necessary image processing such as gradation processing on the ultrasound image signal input from the DSC 56, and then outputs the signal representing the ultrasound image to the display control unit 33, the memory control unit 38, and the scanning determination unit 36. The signal representing the ultrasound image generated by the image generation unit 32 in this manner is simply referred to as an ultrasound image.

The display control unit 33 performs predetermined processing on the ultrasound image sent from the image generation unit 32, and displays the ultrasound image on the main body-side monitor 34, under the control of the main body control unit 41.

The main body-side monitor 34 is for displaying the ultrasound image under the control of the display control unit 33, and includes a display device such as a liquid crystal display (LCD), or an organic electroluminescence (EL) display.

The scanning position detection unit 35 detects the scanning position of the ultrasound probe 1 by analyzing the visual field image C sent from the main body-side wireless communication unit 31. For example, the scanning position detection unit 35 can detect the scanning position of the ultrasound probe 1 by recognizing the distal end portion of the ultrasound probe 1, which is in contact with the surface of the wound S of the subject T, from the visual field image C.

The scanning determination unit 36 determines whether or not the ultrasound probe 1 is performing a scan by analyzing the ultrasound image generated by the image generation unit 32. In a case where the ultrasound probe 1 is in a so-called air radiation state in which the ultrasound probe 1 is not in contact with the body surface of the subject T, the ultrasound image generated by the image generation unit 32 shows a highly uniform brightness distribution over the entire image, but in a case where the ultrasound probe 1 is in contact with the body surface of the subject T and is performing a scan, the ultrasound image generated by the image generation unit 32 shows a brightness distribution having shading corresponding to an internal tissue of the subject T. Therefore, it is possible to determine whether or not the ultrasound probe 1 is performing a scan by analyzing the ultrasound image.

The scanned region mask generation unit 37 generates the scanned region mask M indicating the scanned region by the ultrasound probe 1, on the basis of the visual field image C acquired by the camera 24 of the HMD 2, the scanning position detected by the scanning position detection unit 35, and the determination result as to whether or not the ultrasound probe 1 is performing a scan, which is determined by the scanning determination unit 36.

Assuming that the visual field image C has not been moved between the previous frame and the current frame, in a case where the scanning determination unit 36 determines that the ultrasound probe 1 is performing a scan, the scanned region mask generation unit 37 can recognize a region from the scanning position in the previous frame to the scanning position in the current frame, as the scanned region where a scan has been performed between the previous frame and the current frame. Accordingly, it is possible to generate the scanned region mask M from the past frame by sequentially connecting the scanned region between the previous frame and the current frame, for a plurality of frames consecutive from the past frame to the previous frame.

Figure 7:
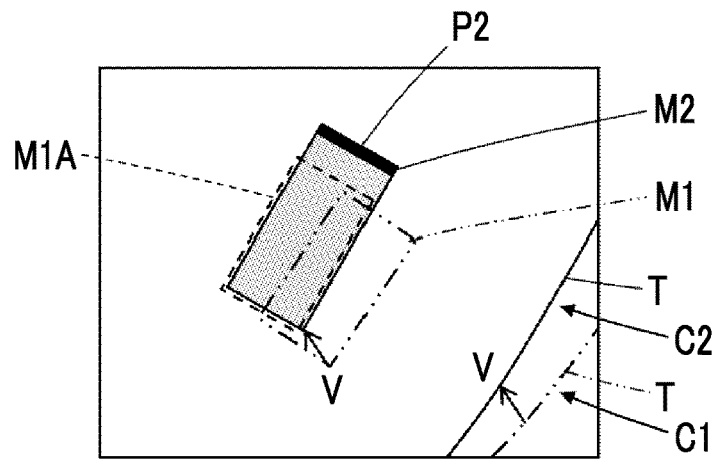
FIG. 7 is a diagram illustrating a generation method of a scanned region mask.

Here, for example, as illustrated in FIG. 7, in a case where a visual field image C2 of the current frame is moved from a visual field image C1 of the previous frame by a movement amount V, it is possible to generate a scanned region mask M2 in the current frame by converting a scanned region mask M1 in the previous frame into a scanned region mask M1A on the basis of the movement amount V, and adding a scanning position P2 in the current frame detected by the scanning position detection unit 35 to the converted scanned region mask M1A to expand the scanned region mask M1A.

In the conversion of the scanned region mask M1, first, a so-called non-rigid registration is performed using the visual field image C1 of the previous frame and the visual field image C2 of the current frame, and a conversion formula that associates a set of feature points in the visual field image C1 of the previous frame with a set of feature points in the visual field image C2 of the current frame is obtained. In this case, in a case where the same fixed object as a landmark is imaged in both the visual field images C1 and C2, the accuracy of registration can be improved by utilizing the landmark.

Next, by applying the obtained conversion formula to the scanned region mask M1 in the previous frame, the scanned region mask M1 can be converted, and thus the converted scanned region mask M1A is obtained.

The memory control unit 38 sends the ultrasound image generated by the image generation unit 32 to the ultrasound image memory 39 under the control of the main body control unit 41.

The ultrasound image memory 39 is a memory that stores ultrasound images of a plurality of frames. For example, the ultrasound image memory 39 can hold the ultrasound images of the series of the plurality of frames, which are generated by the image generation unit 32, corresponding to the diagnosis of the wound S of the subject T. Each ultrasound image is associated with the scanning position of the ultrasound probe 1 detected by the scanning position detection unit 35 and stored in the ultrasound image memory 39 in association with the scanning position.

The visual field image memory 40 stores the visual field image C sent from the main body-side wireless communication unit 31 and the image signal of the scanned region mask M generated by the scanned region mask generation unit 37.

Here, as the ultrasound image memory 39 and the visual field image memory 40, recording media such as a flash memory, a hard disc drive (HDD), a solid state drive (SSD), a flexible disc (FD), a magneto-optical disc (MO disc), a magnetic tape (MT), a random access memory (RAM), a compact disc (CD), a digital versatile disc (DVD), a secure digital card (SD card), and a universal serial bus memory (USB memory), a server, or the like can be used.

The input unit 42 is for the user to perform an input operation, and includes a touch sensor arranged over the main body-side monitor 34.

The main body control unit 41 controls each unit of the diagnostic apparatus main body 3 on the basis of a control program and the like stored in advance.

Although not illustrated, a main body-side storage unit is connected to the main body control unit 41. The main body-side storage unit stores a control program and the like of the diagnostic apparatus main body 3. As the main body-side storage unit, for example, a flash memory, a RAM, an SD card, an SSD, and the like can be used.

Although not illustrated, a battery is built in the diagnostic apparatus main body 3, and power is supplied from the battery to each circuit of the diagnostic apparatus main body 3.

The main body-side processor 43 having the main body-side wireless communication unit 31, the image generation unit 32, the display control unit 33, the scanning position detection unit 35, the scanning determination unit 36, the scanned region mask generation unit 37, the memory control unit 38, and the main body control unit 41 is configured by a central processing unit (CPU) and a control program for causing the CPU to execute various kinds of processing, but the main body-side processor 43 may be configured by using a field programmable gate array (FPGA), a digital signal processor (DSP), an application specific integrated circuit (ASIC), a graphics processing unit (GPU), or other integrated circuits (IC) or may be configured by a combination thereof.

In addition, the main body-side wireless communication unit 31, the image generation unit 32, the display control unit 33, the scanning position detection unit 35, the scanning determination unit 36, the scanned region mask generation unit 37, the memory control unit 38, and the main body control unit 41 of the main body-side processor 43 can also be configured by being integrated partially or entirely into one CPU or the like.

Figure 8:
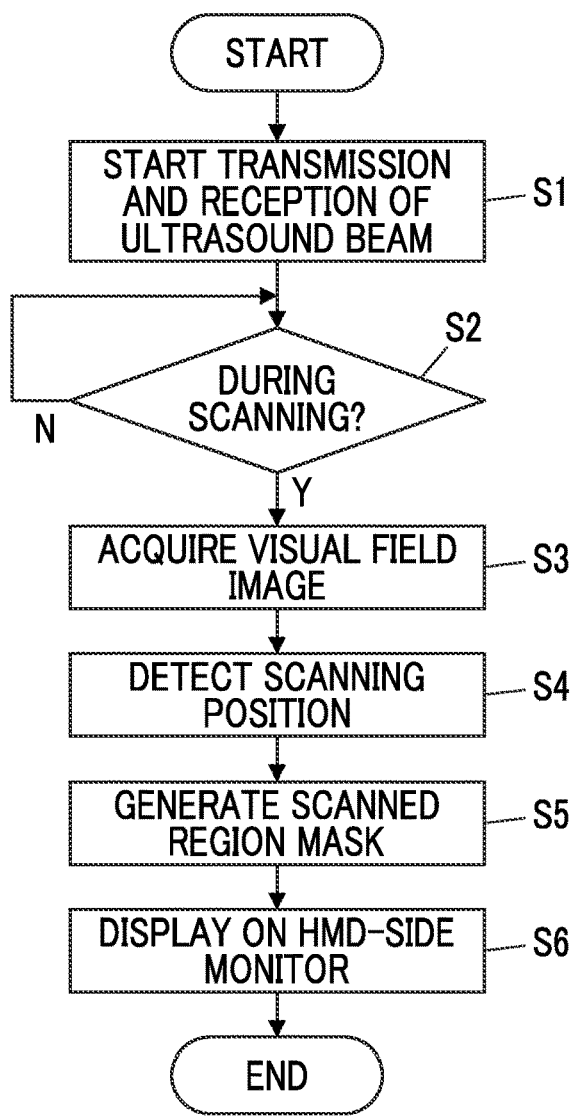
FIG. 8 is a flowchart illustrating an operation of the ultrasound diagnostic apparatus according to the first embodiment.

Next, the operation of the ultrasound diagnostic apparatus according to the first embodiment of the present invention will be described with reference to the flowchart in FIG. 8.

First, in Step S1, the ultrasound probe 1 is brought into contact on the body surface of the wound S of the subject T by the user, and the transmission and reception of the ultrasonic waves toward the inside of the subject T from the plurality of transducers of the transducer array 11 is started according to the drive signals from the pulser 51 of the transmission and reception circuit 12 under the control of the probe control unit 14. The ultrasound echo by the tissue in the subject T is received by the plurality of transducers of the transducer array 11, the reception signal as the analog signal is output to the amplification unit 52 to be amplified, and is subjected to the AD conversion in the AD conversion unit 53, and thereby the reception data is acquired. By performing the reception focusing processing on the reception data by the beam former 54, the sound ray signal generated in this manner is wirelessly transmitted from the probe-side wireless communication unit 13 to the diagnostic apparatus main body 3.

The main body-side wireless communication unit 31 of the diagnostic apparatus main body 3 receives the sound ray signal wirelessly transmitted from the ultrasound probe 1 and sends the sound ray signal to the image generation unit 32, and the image generation unit 32 generates the ultrasound image representing tomographic image information regarding the tissue in the subject T. In this case, the signal processing unit 55 of the image generation unit 32 performs the correction of the attenuation according to the depth of the reflection position of the ultrasonic wave and the envelope detection processing on the sound ray signal, the DSC 56 performs the conversion into the image signal according to a normal television signal scanning method, and the image processing unit 57 performs various kinds of necessary image processing such as gradation processing.

The ultrasound image generated by the image generation unit 32 is subjected to the predetermined processing by the display control unit 33, and then is displayed on the main body-side monitor 34.

Further, the ultrasound image generated by the image generation unit 32 is sent to the ultrasound image memory 39 by the memory control unit 38 and is stored.

Next, in Step S2, whether or not the ultrasound probe 1 is performing a scan is determined by the scanning determination unit 36. The scanning determination unit 36 analyzes the ultrasound image generated by the image generation unit 32, and determines whether or not the ultrasound probe 1 is in contact with the body surface of the subject T and is performing a scan or the ultrasound probe 1 is not in contact with the body surface of the subject T and is in an air radiation state by analyzing the brightness distribution of the ultrasound image, for example.

As a result of the determination in Step S2, in a case where it is determined that the ultrasound probe 1 is performing a scan, the processing proceeds to Step S3, and the visual field image C is acquired by the camera 24 of the HMD 2. In this case, a command to request the visual field image C is wirelessly transmitted from the main body control unit 41 of the diagnostic apparatus main body 3 to the HMD 2 via the main body-side wireless communication unit 31, the command received by the HMD-side wireless communication unit 21 is input to the HMD control unit 25, and the visual field image C is captured by the camera 24 under the control of the HMD control unit 25.

As illustrated in FIG. 4, in the visual field image C, the subject T positioned in front of the user and the ultrasound probe 1 in contact with the surface of the wound S of the subject T are imaged.

The visual field image C acquired by the camera 24 is sent to the HMD-side wireless communication unit 21. The visual field image C sent to the HMD-side wireless communication unit 21 is wirelessly transmitted from the HMD-side wireless communication unit 21 to the diagnostic apparatus main body 3, and the visual field image C is received by the main body-side wireless communication unit 31 of the diagnostic apparatus main body 3, and is sent to the scanning position detection unit 35.

In subsequent Step S4, the scanning position of the ultrasound probe 1 is detected by the scanning position detection unit 35. In this case, the scanning position detection unit 35 detects the scanning position of the ultrasound probe 1 by analyzing the visual field image C acquired by the camera 24 of the HMD 2, and recognizing the distal end portion of the ultrasound probe 1 that is in contact with the surface of the wound S of the subject T.

In a case where the scanning position of the ultrasound probe 1 is detected, the processing proceeds to Step S5, and the scanned region mask M is generated by the scanned region mask generation unit 37. In this case, as illustrated in FIG. 7, the scanned region mask generation unit 37 performs the non-rigid registration using the visual field image C1 of the previous frame and the visual field image C2 of the current frame, obtains a conversion formula that associates a set of feature points in the visual field image C1 of the previous frame with a set of feature points in the visual field image C2 of the current frame, and applies the conversion formula to the scanned region mask M1 in the previous frame to create the scanned region mask M1A converted in consideration of the movement of the visual field image C2 of the current frame with respect to the visual field image C1 of the previous frame. Further, the scanned region mask generation unit 37 generates the scanned region mask M2 in the current frame by adding the scanning position P2 in the current frame detected by the scanning position detection unit 35 to the scanned region mask M1A to expand the scanned region mask M1A.

In Step S6, the scanned region mask M generated by the scanned region mask generation unit 37 is wirelessly transmitted to the HMD 2 via the main body-side wireless communication unit 31, and the scanned region mask M received by the HMD-side wireless communication unit 21 is displayed on the HMD-side monitor 23 via the display control unit 22.

In this manner, as illustrated in FIG. 5, the user can check the scanned region mask M displayed on the HMD-side monitor 23 while viewing the subject T and the ultrasound probe 1 in contact with the surface of the wound S of the subject T through the transparent HMD-side monitor 23. Accordingly, even in a case where the ultrasound probe 1 scans a wide range while being slid along the body surface of the subject T, the user can check the scanned region without looking away from the subject T and the ultrasound probe 1. Since the scanned region mask M is displayed on the HMD-side monitor 23 of the HMD 2 worn on the user's head, it is possible to check the scanned region without reducing the visibility even using the portable or handheld compact diagnostic apparatus main body 3.

The ultrasound image generated by the image generation unit 32 is stored in the ultrasound image memory 39 by being associated with the scanning position of the ultrasound probe 1 detected by the scanning position detection unit 35. Therefore, in a case where the visual field image C received by the main body-side wireless communication unit 31 or the visual field image C stored in the visual field image memory 40 is displayed on the main body-side monitor 34, and any position on the visual field image C is designated by the user through the input unit 42, the ultrasound image stored in the ultrasound image memory 39 with the designated position as the scanning position can be read out by the memory control unit 38, and the ultrasound image can be displayed on the main body-side monitor 34.

In this manner, the user can refer to which part of the subject T is shown in the ultrasound image of each frame stored in the ultrasound image memory 39.

In the first embodiment described above, the ultrasound probe 1 and the diagnostic apparatus main body 3 are connected to each other by wireless communication, and the HMD 2 and the diagnostic apparatus main body 3 are connected to each other by wireless communication, but the present invention is not limited thereto. Thus, the ultrasound probe 1 and the diagnostic apparatus main body 3 may be connected to each other by a wire, and the HMD 2 and the diagnostic apparatus main body 3 may be connected to each other by a wire.

In the first embodiment described above, the sound ray signal generated by the transmission and reception circuit 12 of the ultrasound probe 1 is wirelessly transmitted from the probe-side wireless communication unit 13 to the diagnostic apparatus main body 3, but a configuration can be made in which the ultrasound probe 1 includes the signal processing unit 55 of the image generation unit 32 illustrated in FIG. 5 and the ultrasound image signal generated by the signal processing unit 55 is wirelessly transmitted from the probe-side wireless communication unit 13 to the diagnostic apparatus main body 3. Further, a configuration may be made in which the ultrasound probe 1 includes the entire image generation unit 32 illustrated in FIG. 5 and the ultrasound image subjected to the image processing by the image processing unit 57 of the image generation unit 32 is wirelessly transmitted from the probe-side wireless communication unit 13 to the diagnostic apparatus main body 3.

In the first embodiment described above, the user checks the scanned region mask M displayed on the HMD-side monitor 23 while viewing the subject T and the ultrasound probe 1 through the HMD-side monitor 23 having transparency, but the present invention is not limited thereto. For example, a configuration can be made in which the HMD-side monitor 23 has non-transparency, the visual field image C captured by the camera 24 of the HMD 2 is displayed on the HMD-side monitor 23, the user observes the visual field image C displayed on the HMD-side monitor 23, and the scanned region mask M is displayed on the HMD-side monitor 23 by being superimposed on the visual field image C.

Second Embodiment

Figure 9:
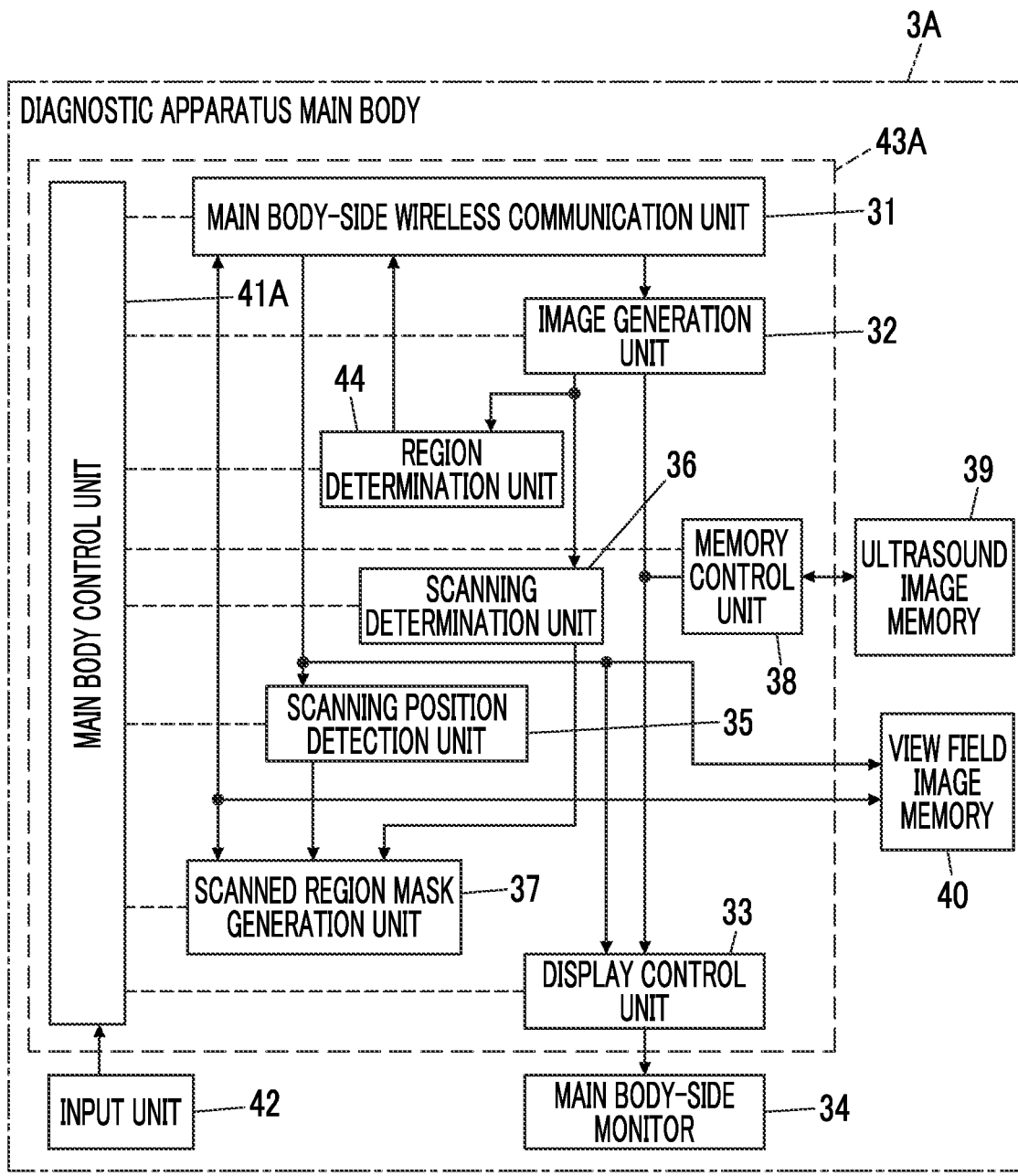
FIG. 9 is a block diagram illustrating a configuration of a diagnostic apparatus main body in a second embodiment.

FIG. 9 illustrates a configuration of a diagnostic apparatus main body 3A of an ultrasound diagnostic apparatus according to the second embodiment. The diagnostic apparatus main body 3A is obtained by newly connecting a region determination unit 44 to the main body-side wireless communication unit 31 and the image generation unit 32 and using a main body control unit 41A instead of the main body control unit 41 in the diagnostic apparatus main body 3 of the first embodiment illustrated in FIG. 1, and the other configuration of the diagnostic apparatus main body 3A is the same as the diagnostic apparatus main body 3 of the first embodiment. The diagnostic apparatus main body 3A is used in a state of being wirelessly connected to each of the ultrasound probe 1 and the HMD 2 illustrated in FIG. 1.

The ultrasound diagnostic apparatus according to the second embodiment determines a pressure ulcer region R1 and an edema region R2 in the wound S of the subject T, and displays the body surface portion of the subject T corresponding to the pressure ulcer region R1 and the edema region R2 on the HMD-side monitor 23.

The region determination unit 44 determines the pressure ulcer region R1 and the edema region R2 in the wound S of the subject T by analyzing the ultrasound image generated by the image generation unit 32, and sends the determined pressure ulcer region R1 and edema region R2 to the main body-side wireless communication unit 31.

Figure 10:
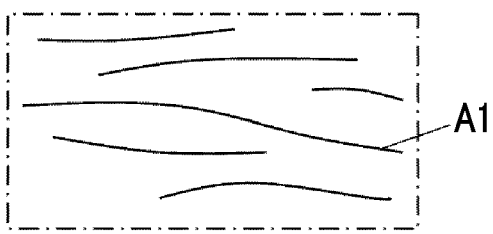
FIG. 10 is a diagram schematically illustrating an unclear layered structure pattern.
Figure 11:
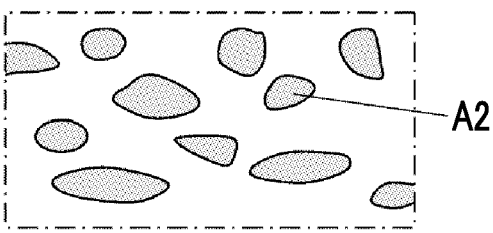
FIG. 11 is a diagram schematically illustrating a Cobblestone-like pattern.
Figure 12:
FIG. 12 is a diagram schematically illustrating a Cloud-like pattern.
Figure 13:
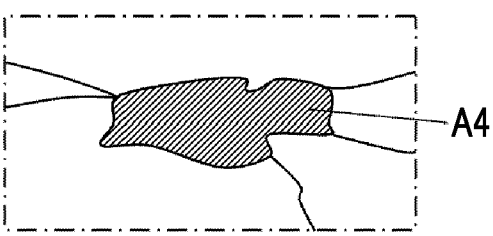
FIG. 13 is a diagram schematically illustrating a pattern in which fluid retention is observed.

In a case where the ultrasound image as the tomographic plane image is captured for the wound with the pressure ulcer, a unclear layered structure pattern A1 illustrated in FIG. 10, a Cobblestone-like pattern A2 illustrated in FIG. 11, a Cloud-like pattern A3 illustrated in FIG. 12, or a pattern A4 in which fluid retention is observed illustrated in FIG. 13 are obtained according to the degree of the pressure ulcer. The unclear layered structure pattern A1 illustrated in FIG. 10 and the Cobblestone-like pattern A2 illustrated in FIG. 11 correspond to the edema, and the Cloud-like pattern A3 illustrated in FIG. 12 and the pattern A4 in which fluid retention is observed as illustrated in FIG. 13 correspond to the pressure ulcer including necrosis, pyocele, a hematoma, and dropsy.

Thus, the region determination unit 44 can calculate, for example, each of a probability corresponding to the unclear layered structure pattern A1, a probability corresponding to the Cobblestone-like pattern A2, a probability corresponding to the Cloud-like pattern A3, and a probability corresponding to the pattern A4 in which fluid retention is observed, for each pixel of the ultrasound image by using a deep learning method such as so-called U-net, and determine whether the pixel belongs to any of the pressure ulcer region R1 or the edema region R2 or whether the pixel belongs to neither.

The main body control unit 41A is connected to the main body-side wireless communication unit 31, the image generation unit 32, the display control unit 33, the scanning position detection unit 35, the scanning determination unit 36, the scanned region mask generation unit 37, the memory control unit 38, and the region determination unit 44, and the input unit 42 is connected to the main body control unit 41A.

The main body-side wireless communication unit 31, the image generation unit 32, the display control unit 33, the scanning position detection unit 35, the scanning determination unit 36, the scanned region mask generation unit 37, the memory control unit 38, the region determination unit 44, and the main body control unit 41A constitute a main body-side processor 43A.

Figure 14:
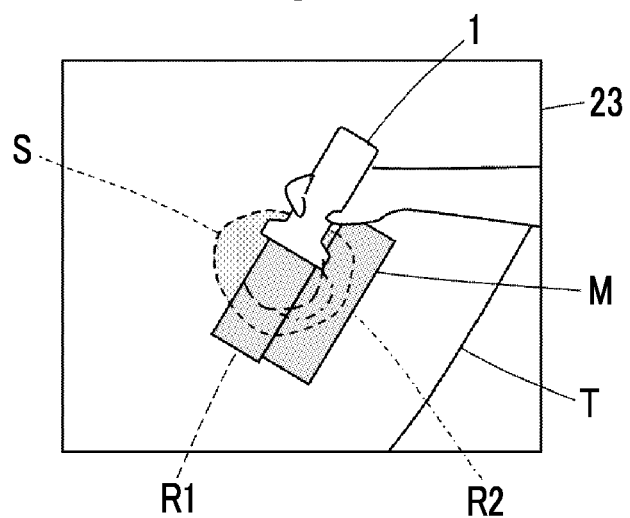
FIG. 14 is a diagram illustrating a head-mounted display-side monitor on which a pressure ulcer region and an edema region are displayed.

The pressure ulcer region R1 and the edema region R2 determined by the region determination unit 44 are wirelessly transmitted from the main body-side wireless communication unit 31 to the HMD 2, and is displayed on the HMD-side monitor 23 by being superimposed on the scanned region mask M as illustrated in FIG. 14. In this case, for example, the pressure ulcer region R1 and the edema region R2 can be displayed by performing classification using color such that the scanned region mask M is displayed in blue, the body surface portions of the subject T corresponding to the pressure ulcer region R1 and the edema region R2 are displayed in red and green, respectively.

In this manner, by determining the pressure ulcer region R1 and the edema region R2 and displaying the pressure ulcer region R1 and the edema region R2 on the HMD-side monitor 23, it is possible for the user to visually understand the positions of the pressure ulcer region R1 and the edema region R2 in the deep portion of the subject T.

Third Embodiment

Figure 15:
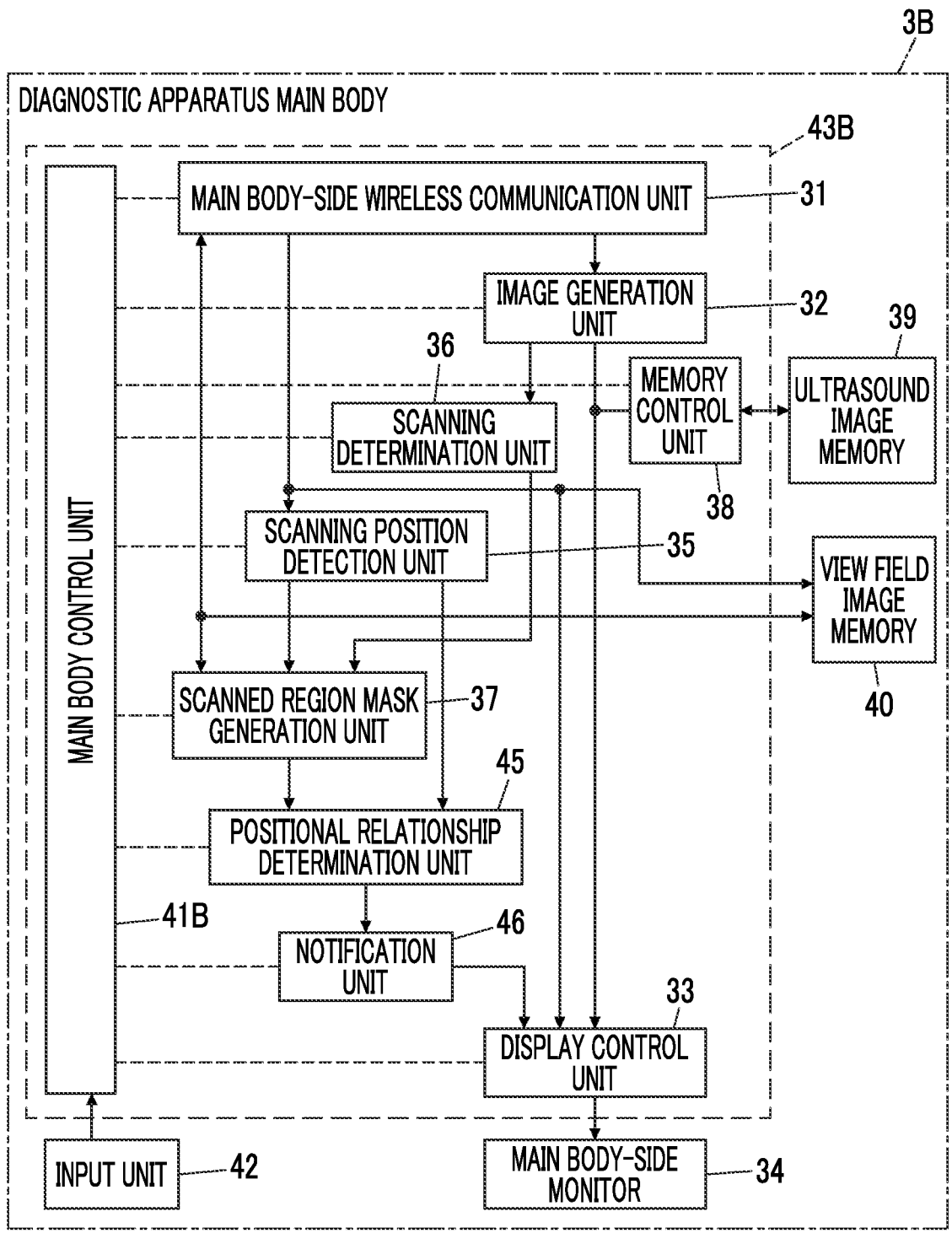
FIG. 15 is a block diagram illustrating a configuration of a diagnostic apparatus main body in a third embodiment.

FIG. 15 illustrates a configuration of a diagnostic apparatus main body 3B of an ultrasound diagnostic apparatus according to the third embodiment. The diagnostic apparatus main body 3B is obtained by connecting a positional relationship determination unit 45 to the scanning position detection unit 35 and the scanned region mask generation unit 37 and connecting a notification unit 46 to the positional relationship determination unit 45 and the display control unit 33 and using a main body control unit 41B instead of the main body control unit 41 in the diagnostic apparatus main body 3 of the first embodiment illustrated in FIG. 1, and the other configuration of the diagnostic apparatus main body 3B is the same as the diagnostic apparatus main body 3 of the first embodiment. The diagnostic apparatus main body 3B is used in a state of being wirelessly connected to each of the ultrasound probe 1 and the HMD 2 illustrated in FIG. 1.

The ultrasound diagnostic apparatus according to the third embodiment is configured to perform a notification to the user in a case where the current scanning position by the ultrasound probe 1 excessively overlaps the scanned region indicated by the scanned region mask M or a gap that has not been scanned is generated between the current scanning position by the ultrasound probe 1 and the scanned region indicated by the scanned region mask M.

The main body control unit 41B is connected to the main body-side wireless communication unit 31, the image generation unit 32, the display control unit 33, the scanning position detection unit 35, the scanning determination unit 36, the scanned region mask generation unit 37, the memory control unit 38, the positional relationship determination unit 45, and the notification unit 46, and the input unit 42 is connected to the main body control unit 41B.

The main body-side wireless communication unit 31, the image generation unit 32, the display control unit 33, the scanning position detection unit 35, the scanning determination unit 36, the scanned region mask generation unit 37, the memory control unit 38, the positional relationship determination unit 45, the notification unit 46, and the main body control unit 41B constitute a main body-side processor 43B.

The positional relationship determination unit 45 determines a positional relationship between the current scanning position by the ultrasound probe 1 detected by the scanning position detection unit 35 and a scanned region MR indicated by the scanned region mask M generated by the scanned region mask generation unit 37.

Figure 16:
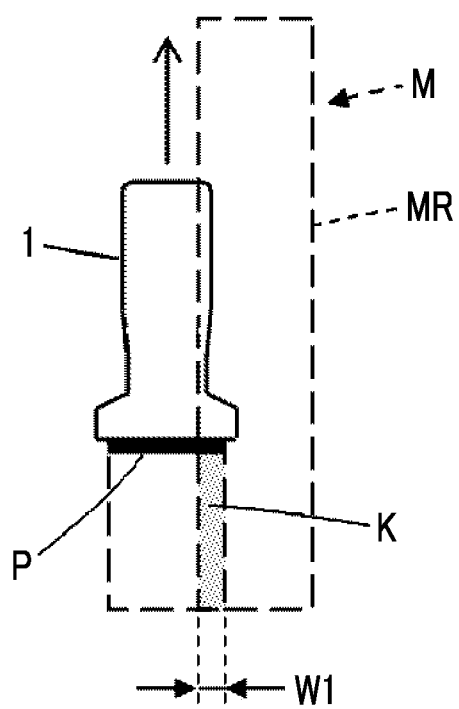
FIG. 16 is a diagram schematically illustrating a state in which a scanning position of an ultrasound probe overlaps a scanned region.

For example, as illustrated in FIG. 16, in a case where an overlapping portion K is formed between a current scanning position P by the ultrasound probe 1 and the scanned region MR indicated by the scanned region mask M and a width W1 of the overlapping portion K exceeds a predetermined threshold value, the positional relationship determination unit 45 determines that the current scanning position P excessively overlaps the scanned region MR. Then, a command is sent from the positional relationship determination unit 45 to the notification unit 46, and, for example, a notification such as "excessively overlaps the scanned region" is displayed on the main body-side monitor 34 by the notification unit 46 via the display control unit 33.

Figure 17:
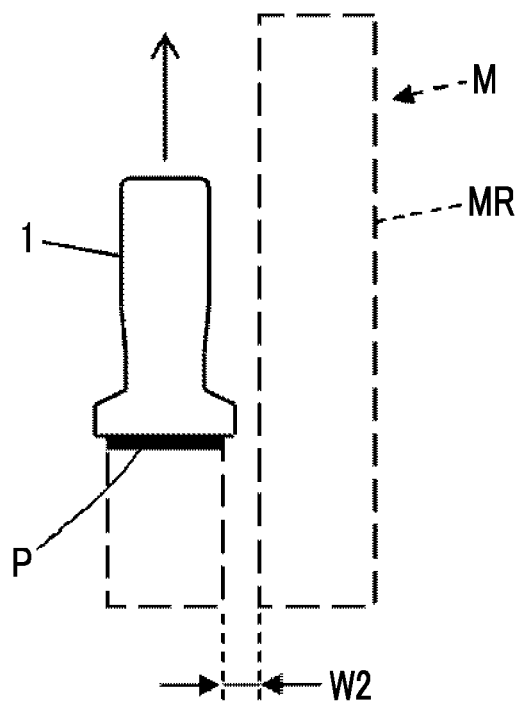
FIG. 17 is a diagram schematically illustrating a state in which a gap is generated between a scanning position of the ultrasound probe and a scanned region.

Further, for example, as illustrated in FIG. 17, in a case where the current scanning position P by the ultrasound probe 1 is separated from the scanned region MR indicated by the scanned region mask M so that a gap having a width W2 is formed between the current scanning position P by the ultrasound probe 1 and the scanned region MR, the positional relationship determination unit 45 determines that a gap that has not been scanned is generated between the current scanning position P and the scanned region MR. Then, a command is sent from the positional relationship determination unit 45 to the notification unit 46, and, for example, a notification such as "there is a missed portion between the scanned region" is displayed on the main body-side monitor 34 by the notification unit 46 via the display control unit 33.

In this manner, by determining the positional relationship between the current scanning position P by the ultrasound probe 1 and the scanned region MR and issuing a notification in a case where the current scanning position P and the scanned region MR overlap at a width exceeding the predetermined threshold value or a gap is generated between the current scanning position P and the scanned region MR, it is possible for the user to immediately recognize whether or not the current scanning position P by the ultrasound probe 1 is appropriate, and to efficiently scan a wide range while sliding the ultrasound probe 1.

The notification that is made to the user in response to the command from the notification unit 46 can be made by using sound instead of displaying the notification on the main body-side monitor 34 or in addition to displaying the notification on the main body-side monitor 34, or can be made by giving vibration to the ultrasound probe 1 and the diagnostic apparatus main body 3.

Fourth Embodiment

Figure 18:
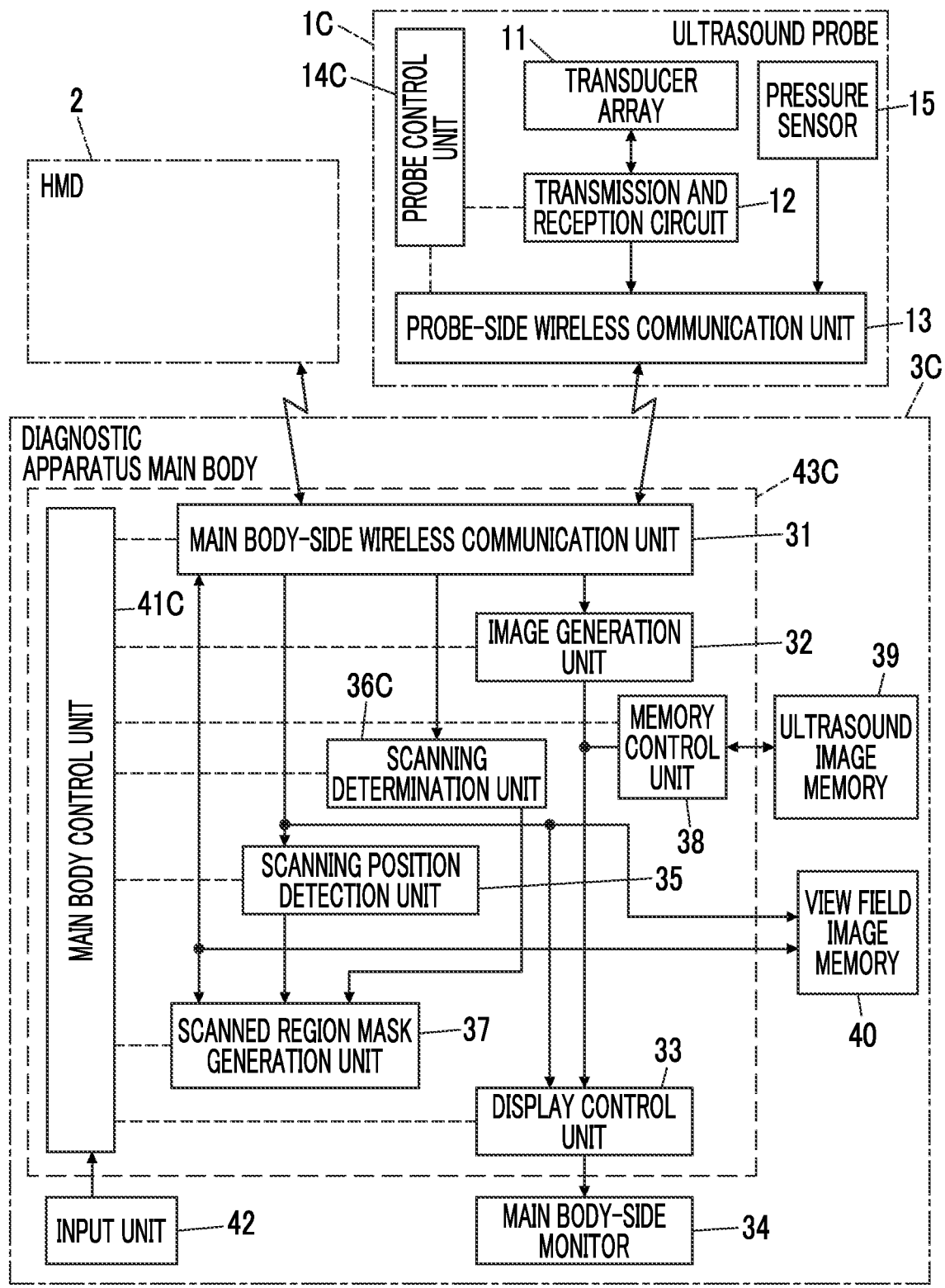
FIG. 18 is a block diagram illustrating a configuration of an ultrasound diagnostic apparatus according to a fourth embodiment.

FIG. 18 illustrates a configuration of an ultrasound diagnostic apparatus according to a fourth embodiment. The ultrasound diagnostic apparatus of the fourth embodiment is obtained by using an ultrasound probe 1C and a diagnostic apparatus main body 3C instead of the ultrasound probe 1 and the diagnostic apparatus main body 3 in the ultrasound diagnostic apparatus of the first embodiment illustrated in FIG. 1.

The ultrasound probe 1C is obtained by connecting a pressure sensor 15 to the probe-side wireless communication unit 13 and using a probe control unit 14C instead of the probe control unit 14 in the ultrasound probe 1 illustrated in FIG. 1, and the other configuration of the ultrasound probe 1C is the same as the ultrasound probe 1 of the first embodiment.

The diagnostic apparatus main body 3C is obtained by connecting a scanning determination unit 36C instead of the scanning determination unit 36 to the main body-side wireless communication unit 31 and the scanned region mask generation unit 37 and using a main body control unit 41C instead of the main body control unit 41 in the diagnostic apparatus main body 3 illustrated in FIG. 1, and the other configuration of the diagnostic apparatus main body 3C is the same as the diagnostic apparatus main body 3 of the first embodiment.

In the ultrasound diagnostic apparatus according to the fourth embodiment, the diagnostic apparatus main body 3C is used in a state of being wirelessly connected to each of the ultrasound probe 1C and the HMD 2 that is illustrated in FIG. 1.

The ultrasound diagnostic apparatus according to the fourth embodiment determines whether or not the ultrasound probe 1C is performing a scan, by the scanning determination unit 36C of the diagnostic apparatus main body 3C, by using the pressure sensor 15 mounted on the ultrasound probe 1C.

The pressure sensor 15 detects a pressure acting on the distal end surface of the ultrasound probe 1C. Accordingly, in a case where a detected value of the pressure sensor 15 exceeds a predetermined threshold value, it is possible to understand that the distal end surface of the ultrasound probe 1C is pressed against the body surface of the subject T and a scan is being performed.

The main body control unit 41C is connected to the main body-side wireless communication unit 31, the image generation unit 32, the display control unit 33, the scanning position detection unit 35, the scanning determination unit 36C, the scanned region mask generation unit 37, and the memory control unit 38, and the input unit 42 is connected to the main body control unit 41C.

The main body-side wireless communication unit 31, the image generation unit 32, the display control unit 33, the scanning position detection unit 35, the scanning determination unit 36C, the scanned region mask generation unit 37, the memory control unit 38, and the main body control unit 41C constitute a main body-side processor 43C.

The detected value of the pressure obtained by the pressure sensor 15 of the ultrasound probe 1C is wirelessly transmitted from the probe-side wireless communication unit 13 to the diagnostic apparatus main body 3C, and is input from the main body-side wireless communication unit 31 of the diagnostic apparatus main body 3C to the scanning determination unit 36C. The scanning determination unit 36C compares the detected value of the pressure with the predetermined threshold value, and determines that the ultrasound probe 1C is performing a scan in a case where the detected value of the pressure exceeds the predetermined threshold value.

The scanned region mask generation unit 37 generates the scanned region mask M indicating the scanned region by the ultrasound probe 1C, on the basis of the visual field image C wirelessly transmitted from the HMD 2 to the diagnostic apparatus main body 3C, the scanning position detected by the scanning position detection unit 35, and the determination result as to whether or not the ultrasound probe 1C is performing a scan, which is determined by the scanning determination unit 36C. The scanned region mask M is wirelessly transmitted from the main body-side wireless communication unit 31 to the HMD 2, and is displayed on the HMD-side monitor 23.

Further, the diagnostic apparatus main body 3C can be configured to be wirelessly connected to each of the ultrasound probe 1 and the HMD 2 illustrated in FIG. 1, and the scanning determination unit 36C can receive the visual field image C wirelessly transmitted from the HMD 2 to the main body-side wireless communication unit 31 of the diagnostic apparatus main body 3C, analyze the visual field image C, and determine whether or not the ultrasound probe 1 is performing a scan.

Since the body surface of the subject T and the ultrasound probe 1 are shown in the visual field image C, it is possible to determine that the ultrasound probe 1 is in contact with the body surface of the subject T and performing a scan, by analyzing the visual field image C.

Further, in the diagnostic apparatus main body 3 illustrated in FIG. 1, a configuration can be made in which, in a case of performing a scan of the ultrasound probe 1, the user performs an input indicating that a scan is to be performed, from the input unit 42, and the scanning determination unit 36 determines that the ultrasound probe 1 is performing a scan on the basis of the input indicating a scan is to be performed by the user.

Fifth Embodiment

Figure 19:
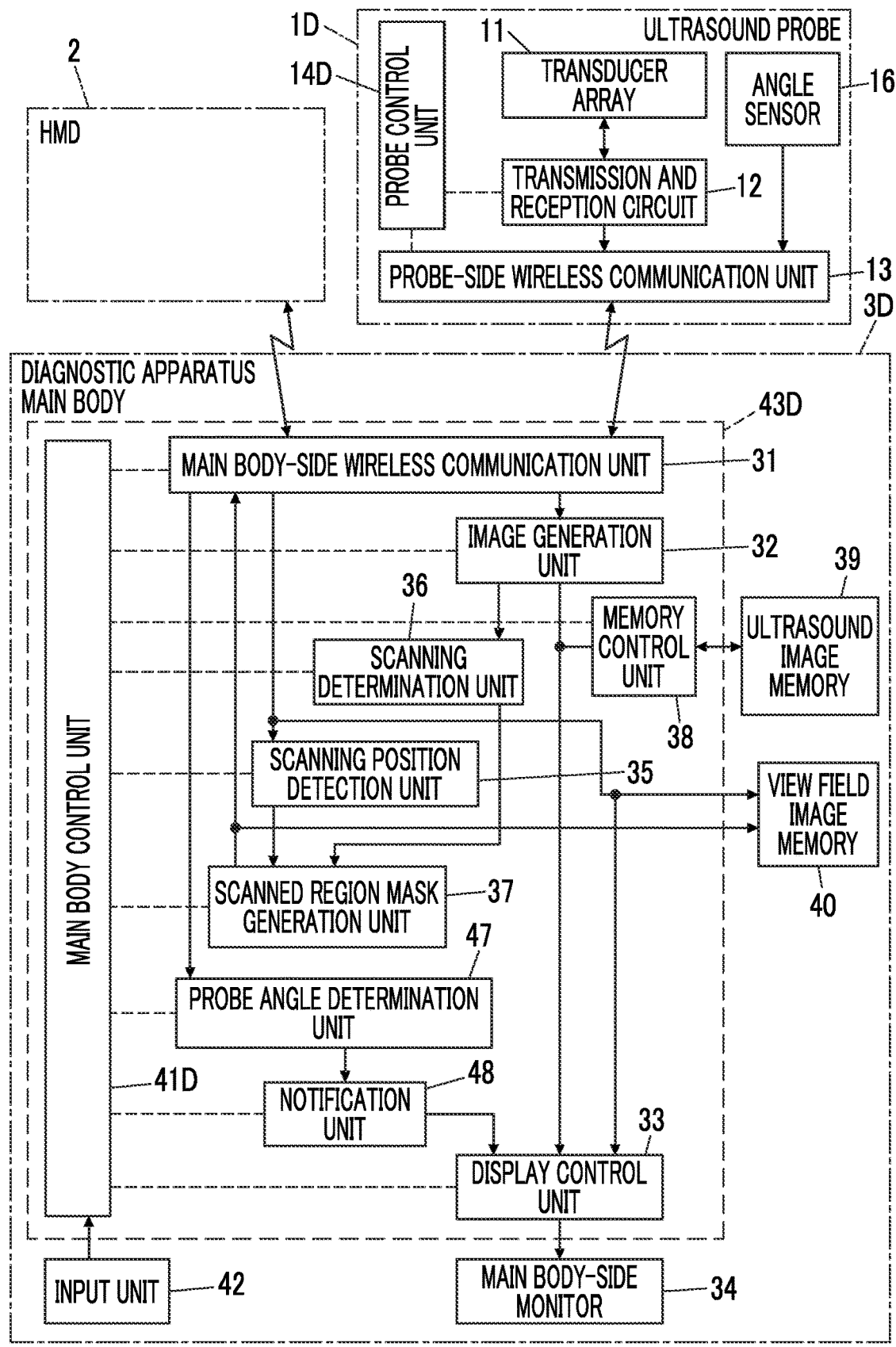
FIG. 19 is a block diagram illustrating a configuration of an ultrasound diagnostic apparatus according to a fifth embodiment.

FIG. 19 illustrates a configuration of an ultrasound diagnostic apparatus according to a fifth embodiment. The ultrasound diagnostic apparatus of the fifth embodiment is obtained by using an ultrasound probe 1D and a diagnostic apparatus main body 3D instead of the ultrasound probe 1 and the diagnostic apparatus main body 3 in the ultrasound diagnostic apparatus of the first embodiment illustrated in FIG. 1.

The ultrasound probe 1D is obtained by connecting an angle sensor 16 to the probe-side wireless communication unit 13 and using a probe control unit 14D instead of the probe control unit 14 in the ultrasound probe 1 illustrated in FIG. 1, and the other configuration of the ultrasound probe 1D is the same as the ultrasound probe 1 of the first embodiment.

The diagnostic apparatus main body 3D is obtained by connecting a probe angle determination unit 47 to the main body-side wireless communication unit 31, connecting a notification unit 48 to the probe angle determination unit 47 and the display control unit 33, and using a main body control unit 41D instead of the main body control unit 41 in the diagnostic apparatus main body 3 illustrated in FIG. 1, and the other configuration of the diagnostic apparatus main body 3D is the same as the diagnostic apparatus main body 3 of the first embodiment.

In the ultrasound diagnostic apparatus according to the fifth embodiment, the diagnostic apparatus main body 3D is used in a state of being wirelessly connected to each of the ultrasound probe 1D and the HMD 2 that is illustrated in FIG. 1.

The angle sensor 16 detects an inclined angle of the ultrasound probe 1D with respect to the body surface of the subject T. In a case where the angle of the ultrasound probe 1D is changed during the scan, the correspondence between the scanning position of the ultrasound probe 1D in contact with the body surface of the subject T and the ultrasound image generated by the image generation unit 32 becomes inaccurate. Thus, the ultrasound diagnostic apparatus according to the fifth embodiment is configured to issue a notification to the user in a case where the angle of the ultrasound probe 1D detected by the angle sensor 16 is changed.

The main body control unit 41D is connected to the main body-side wireless communication unit 31, the image generation unit 32, the display control unit 33, the scanning position detection unit 35, the scanning determination unit 36, the scanned region mask generation unit 37, the memory control unit 38, the probe angle determination unit 47, and the notification unit 48, and the input unit 42 is connected to the main body control unit 41D.

The main body-side wireless communication unit 31, the image generation unit 32, the display control unit 33, the scanning position detection unit 35, the scanning determination unit 36, the scanned region mask generation unit 37, the memory control unit 38, the probe angle determination unit 47, the notification unit 48, and the main body control unit 41D constitute a main body-side processor 43D.

The detected value of the angle of the ultrasound probe 1D obtained by the angle sensor 16 of the ultrasound probe 1D is wirelessly transmitted from the probe-side wireless communication unit 13 to the diagnostic apparatus main body 3D, and is input from the main body-side wireless communication unit 31 of the diagnostic apparatus main body 3D to the probe angle determination unit 47. The probe angle determination unit 47 determines that the angle of the ultrasound probe 1D is changed in a case where the detected value of the angle of the ultrasound probe 1D is changed by a predetermined threshold value or more. Then, a command is sent from the probe angle determination unit 47 to the notification unit 48, and, for example, a notification such as "please, correct the angle of the ultrasound probe" is displayed on the main body-side monitor 34 by the notification unit 48 via the display control unit 33.

In general, it is desirable that the angle of the ultrasound probe 1D is perpendicular to the body surface of the subject T. For example, assuming that the angle of the ultrasound probe 1D in a case where the distal end portion of the ultrasound probe 1D is first in contact with the body surface of the subject T is perpendicular to the body surface, the value of the angle is stored, and a notification can be issued in a case where the angle detected by the angle sensor 16 is changed from the stored value by the predetermined threshold value or more. The predetermined threshold value is not limited, but is set to 10 degrees in absolute value of the angle change, for example.

In this manner, by detecting the angle of the ultrasound probe 1D and issuing a notification in a case where the angle is changed, it is possible for the user to perform a scan while holding the angle of the ultrasound probe 1D, and to perform a scan in which the scanning position of the ultrasound probe 1D accurately corresponds to the ultrasound image generated by the image generation unit 32.

The notification that is made to the user in response to the command from the notification unit 48 can be made by using sound instead of displaying the notification on the main body-side monitor 34 or in addition to displaying the notification on the main body-side monitor 34, or can be made by giving vibration to the ultrasound probe 1 and the diagnostic apparatus main body 3.

Sixth Embodiment

Figure 20:
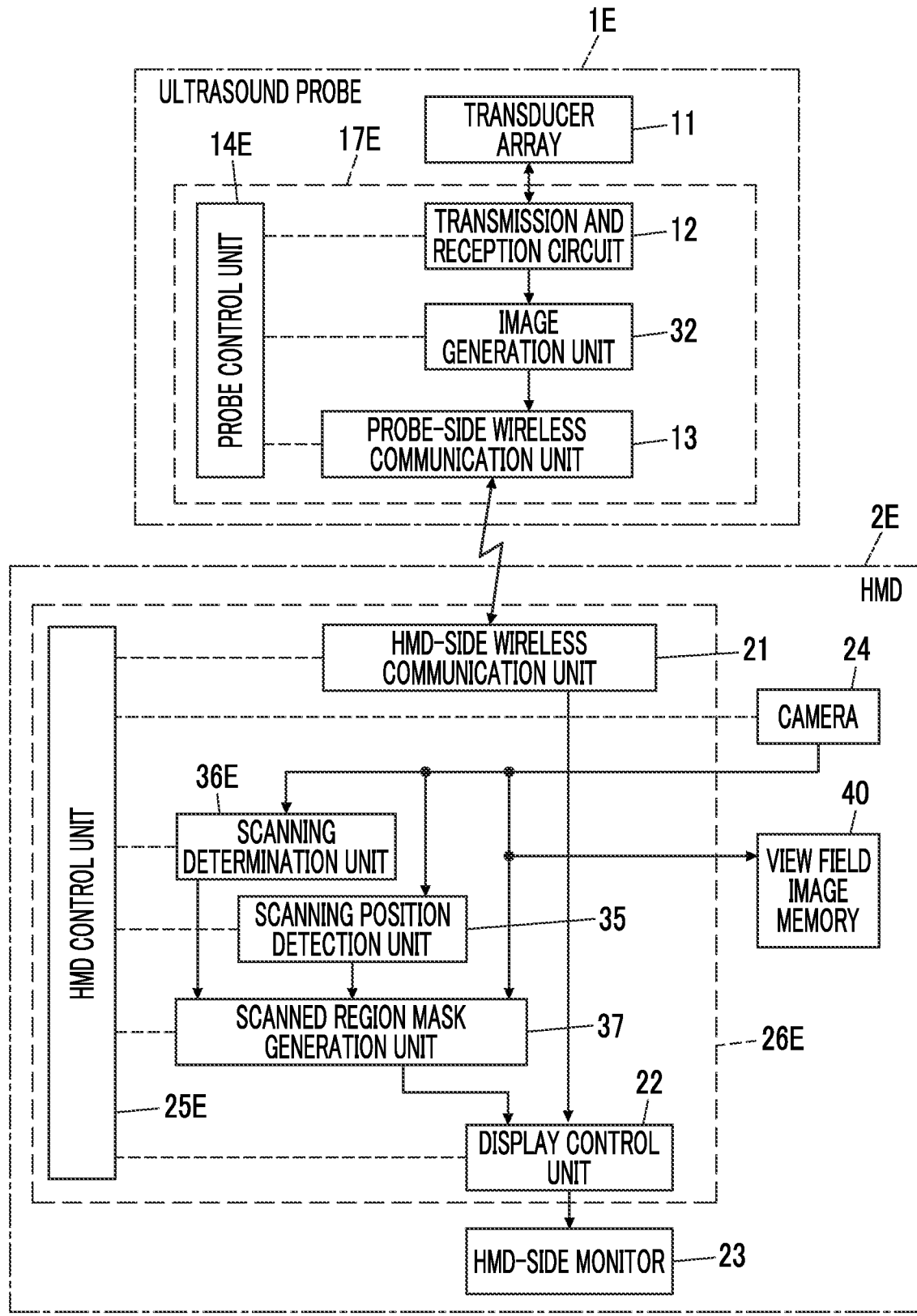
FIG. 20 is a block diagram illustrating a configuration of an ultrasound diagnostic apparatus according to a sixth embodiment.

FIG. 20 illustrates a configuration of an ultrasound diagnostic apparatus according to a sixth embodiment. The ultrasound diagnostic apparatus of the sixth embodiment is obtained by omitting the diagnostic apparatus main body 3 and using an ultrasound probe 1E and an HMD 2E instead of the ultrasound probe 1 and the HMD 2 in the ultrasound diagnostic apparatus of the first embodiment illustrated in FIG. 1. That is, the ultrasound diagnostic apparatus includes only the ultrasound probe 1E and the HMD 2E.

The ultrasound probe 1E is obtained by connecting the image generation unit 32 between the transmission and reception circuit 12 and the probe-side wireless communication unit 13 and using a probe control unit 14E instead of the probe control unit 14 in the ultrasound probe 1 illustrated in FIG. 1, and the other configuration of the ultrasound probe 1E is the same as the ultrasound probe 1 of the first embodiment.

The image generation unit 32 is the same as the image generation unit 32 of the diagnostic apparatus main body 3 illustrated in FIG. 1, and has the internal configuration illustrated in FIG. 6. The probe control unit 14E is connected to the transmission and reception circuit 12, the image generation unit 32, and the probe-side wireless communication unit 13.

The transmission and reception circuit 12, the image generation unit 32, the probe-side wireless communication unit 13, and the probe control unit 14E constitute a probe-side processor 17E.

The HMD 2E is obtained by connecting the scanning position detection unit 35, a scanning determination unit 36E, the scanned region mask generation unit 37, and the visual field image memory 40 to the camera 24 and using an HMD control unit 25E instead of the HMD control unit 25 in the HMD 2 illustrated in FIG. 1, and the other configuration of the HMD 2E is the same as the HMD 2 of the first embodiment.

The scanning determination unit 36E determines whether or not the ultrasound probe 1E is performing a scan by analyzing the visual field image C acquired by the camera 24. Since the body surface of the subject T and the ultrasound probe 1E are shown in the visual field image C, it is possible to determine that the ultrasound probe 1E is in contact with the body surface of the subject T and performing a scan, by analyzing the visual field image C.

The scanning position detection unit 35, the scanned region mask generation unit 37, and the visual field image memory 40 are the same as the scanning position detection unit 35, the scanned region mask generation unit 37, and the visual field image memory 40 used in the diagnostic apparatus main body 3 of the first embodiment illustrated in FIG. 1. The scanning position detection unit 35 and the scanning determination unit 36E are connected to the scanned region mask generation unit 37, and the scanned region mask generation unit 37 is connected to the display control unit 22.

The HMD control unit 25E is connected to the HMD-side wireless communication unit 21, the display control unit 22, the camera 24, the scanning position detection unit 35, the scanning determination unit 36E, and the scanned region mask generation unit 37.

The HMD-side wireless communication unit 21, the display control unit 22, the scanning position detection unit 35, the scanning determination unit 36E, the scanned region mask generation unit 37, and the HMD control unit 25E constitute an HMD-side processor 26E.

The probe-side wireless communication unit 13 of the ultrasound probe 1E and the HMD-side wireless communication unit 21 of the HMD 2E are wirelessly connected to each other.

In the ultrasound diagnostic apparatus according to the sixth embodiment, the visual field image C acquired by the camera 24 is input to each of the visual field image memory 40, the scanning position detection unit 35, and the scanning determination unit 36E, the visual field image C is stored in the visual field image memory 40, the scanning position of the ultrasound probe 1E is detected by the scanning position detection unit 35, and whether or not the ultrasound probe 1E is performing a scan is determined by the scanning determination unit 36E.

The scanned region mask M is generated by the scanned region mask generation unit 37 on the basis of the visual field image C acquired by the camera 24 or the visual field image C stored in the visual field image memory 40, the scanning position detected by the scanning position detection unit 35, and the determination result as to whether or not the ultrasound probe 1E is performing a scan, which is determined by the scanning determination unit 36E, and the scanned region mask M is displayed on the HMD-side monitor 23 via the display control unit 22.

In this manner, in the ultrasound diagnostic apparatus according to the sixth embodiment, even with a configuration including only the ultrasound probe 1E and the HMD 2E without including the diagnostic apparatus main body, it is possible to display the scanned region mask M on the HMD-side monitor 23 of the HMD 2E, and it is possible for the user to check the scanned region without looking away from the subject T and the ultrasound probe 1E, as in the first embodiment.

In the ultrasound diagnostic apparatus according to the sixth embodiment, since the ultrasound probe 1E has the image generation unit 32, the ultrasound image generated by the image generation unit 32 can be wirelessly transmitted from the probe-side wireless communication unit 13 of the ultrasound probe 1E to the HMD-side wireless communication unit 21 of the HMD 2E, and the ultrasound image can be displayed on the HMD-side monitor 23.

However, in a case where there is no need to display the ultrasound image on the HMD-side monitor 23, the HMD-side wireless communication unit 21 of the HMD 2E can be omitted. In this case, the ultrasound image generated by the image generation unit 32 of the ultrasound probe 1E can be transmitted from the ultrasound probe 1E to an information terminal such as a diagnostic apparatus main body in a wireless or wired manner, and can be displayed on a monitor of the information terminal.

Seventh Embodiment

In the ultrasound diagnostic apparatus of the sixth embodiment, the HMD 2E has the scanning determination unit 36E that determines whether or not the ultrasound probe 1E is performing a scan by analyzing the visual field image C, but the present invention is not limited thereto.

Figure 21:
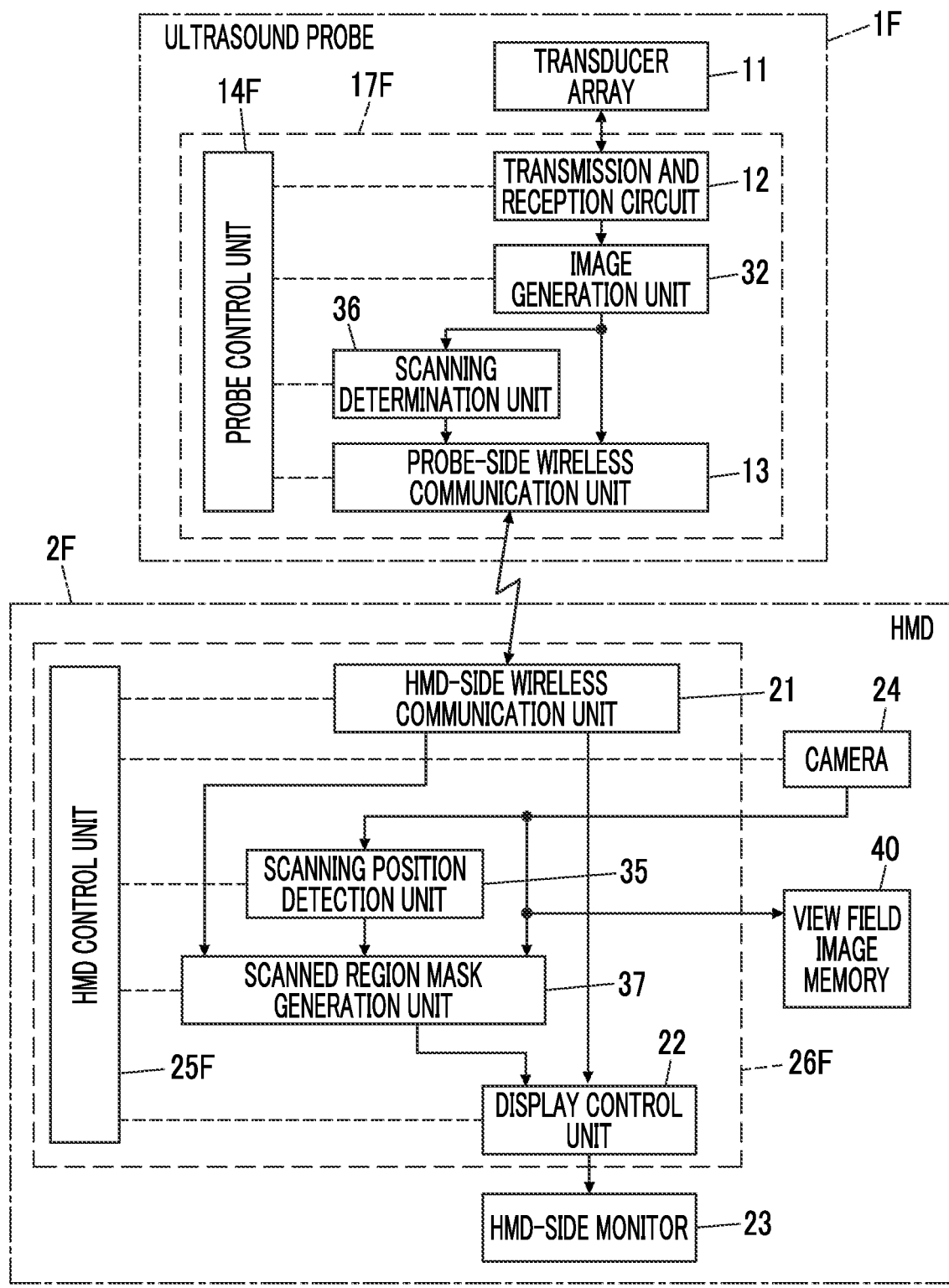
FIG. 21 is a block diagram illustrating a configuration of an ultrasound diagnostic apparatus according to a seventh embodiment.

In the ultrasound diagnostic apparatus of the seventh embodiment illustrated in FIG. 21, an ultrasound probe 1F and an HMD 2F are wirelessly connected to each other, and the ultrasound probe 1F has the scanning determination unit 36.

The ultrasound probe 1F is obtained by connecting the scanning determination unit 36 to the image generation unit 32, connecting the scanning determination unit 36 to the probe-side wireless communication unit 13, and using a probe control unit 14F instead of the probe control unit 14E in the ultrasound probe 1E illustrated in FIG. 20, and the other configuration of the ultrasound probe 1F is the same as the ultrasound probe 1E of the sixth embodiment.

The scanning determination unit 36 is the same as the scanning determination unit 36 of the diagnostic apparatus main body 3 illustrated in FIG. 1, and determines whether or not the ultrasound probe 1F is performing a scan by analyzing the ultrasound image generated by the image generation unit 32. The probe control unit 14F is connected to the transmission and reception circuit 12, the image generation unit 32, the scanning determination unit 36, and the probe-side wireless communication unit 13.

The transmission and reception circuit 12, the image generation unit 32, the scanning determination unit 36, the probe-side wireless communication unit 13, and the probe control unit 14F constitute a probe-side processor 17F.

The HMD 2F is obtained by omitting the scanning determination unit 36E, connecting the scanned region mask generation unit 37 to the HMD-side wireless communication unit 21, and using an HMD control unit 25F instead of the HMD control unit 25E in the HMD 2E illustrated in FIG. 20, and the other configuration of the HMD 2F is the same as the HMD 2E of the sixth embodiment.

The HMD control unit 25F is connected to the HMD-side wireless communication unit 21, the display control unit 22, the camera 24, the scanning position detection unit 35, and the scanned region mask generation unit 37.

The HMD-side wireless communication unit 21, the display control unit 22, the scanning position detection unit 35, the scanned region mask generation unit 37, and the HMD control unit 25F constitute an HMD-side processor 26F.

In the ultrasound diagnostic apparatus according to the seventh embodiment, the scanning determination unit 36 of the ultrasound probe 1F determines whether or not the ultrasound probe 1F is performing a scan by analyzing the ultrasound image generated by the image generation unit 32. The determination result by the scanning determination unit 36 is wirelessly transmitted from the probe-side wireless communication unit 13 to the HMD 2F, is received by the HMD-side wireless communication unit 21 of the HMD 2F, and is sent to the scanned region mask generation unit 37.

The visual field image C acquired by the camera 24 of the HMD 2F is input to each of the visual field image memory 40 and the scanning position detection unit 35, the visual field image C is stored in the visual field image memory 40, and the scanning position of the ultrasound probe 1F is detected by the scanning position detection unit 35.

The scanned region mask M is generated by the scanned region mask generation unit 37 on the basis of the visual field image C acquired by the camera 24 or the visual field image C stored in the visual field image memory 40, the scanning position detected by the scanning position detection unit 35, and the determination result as to whether or not the ultrasound probe 1F is performing a scan, which is input via the HMD-side wireless communication unit 21 and is determined by the scanning determination unit 36, and the scanned region mask M is displayed on the HMD-side monitor 23 via the display control unit 22.

Even in a case where the scanning determination unit 36 of the ultrasound probe 1F determines whether or not the ultrasound probe 1F is performing a scan on the basis of the ultrasound image as in the ultrasound diagnostic apparatus according to the seventh embodiment, it is possible to display the scanned region mask M on the HMD-side monitor 23 of the HMD 2F, and it is possible for the user to check the scanned region without looking away from the subject T and the ultrasound probe 1F, as in the sixth embodiment.

In the ultrasound diagnostic apparatus according to the seventh embodiment, as in the ultrasound diagnostic apparatus of the sixth embodiment, since the ultrasound probe 1F has the image generation unit 32, the ultrasound image generated by the image generation unit 32 can be wirelessly transmitted from the probe-side wireless communication unit 13 of the ultrasound probe 1F to the HMD-side wireless communication unit 21 of the HMD 2F, and the ultrasound image can be displayed on the HMD-side monitor 23.

Eighth Embodiment

In the ultrasound diagnostic apparatus in the seventh embodiment, the scanning determination unit 36 of the ultrasound probe 1F determines whether or not the ultrasound probe 1F is performing a scan by analyzing the ultrasound image generated by the image generation unit 32, but the present invention is not limited thereto.

Figure 22:
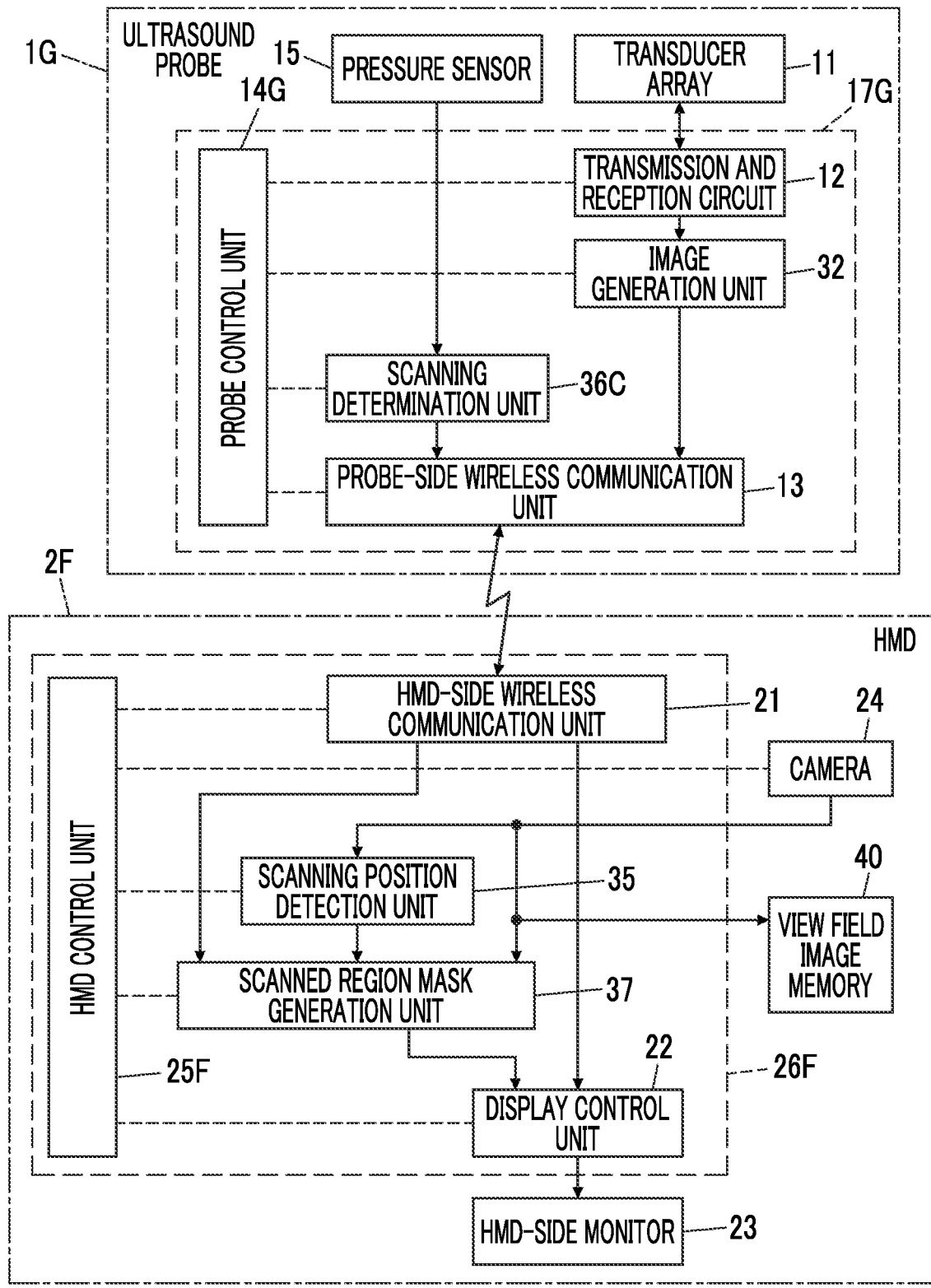
FIG. 22 is a block diagram illustrating a configuration of an ultrasound diagnostic apparatus according to an eighth embodiment.

In the ultrasound diagnostic apparatus of the eighth embodiment illustrated in FIG. 22, an ultrasound probe 1G has the pressure sensor 15 and the scanning determination unit 36C.

The ultrasound probe 1G is obtained by connecting the scanning determination unit 36C instead of the scanning determination unit 36 to the probe-side wireless communication unit 13, connecting the pressure sensor 15 to the scanning determination unit 36, and using a probe control unit 14G instead of the probe control unit 14F in the ultrasound probe 1F illustrated in FIG. 21, and the other configuration of the ultrasound probe 1G is the same as the ultrasound probe 1F of the seventh embodiment.

The pressure sensor 15 is the same as the pressure sensor 15 of the ultrasound probe 1C in the fourth embodiment illustrated in FIG. 18, and detects a pressure acting on the distal end surface of the ultrasound probe 1G. Accordingly, in a case where a detected value of the pressure sensor 15 exceeds a predetermined threshold value, it is possible to understand that the distal end surface of the ultrasound probe 1G is pressed against the body surface of the subject T and a scan is being performed.

The scanning determination unit 36C is the same as the scanning determination unit 36C of the diagnostic apparatus main body 3C in the fourth embodiment illustrated in FIG. 18, compares the detected value of the pressure obtained by the pressure sensor 15 with the predetermined threshold value, and determines that the ultrasound probe 1G is performing a scan in a case where the detected value of the pressure exceeds the predetermined threshold value.

The probe control unit 14G is connected to the transmission and reception circuit 12, the image generation unit 32, the scanning determination unit 36C, and the probe-side wireless communication unit 13.

The transmission and reception circuit 12, the image generation unit 32, the scanning determination unit 36C, the probe-side wireless communication unit 13, and the probe control unit 14G constitute a probe-side processor 17G.

In the ultrasound diagnostic apparatus according to the eighth embodiment, the ultrasound probe 1G is used in a state of being wirelessly connected to the HMD 2F in the seventh embodiment illustrated in FIG. 21.

In the ultrasound diagnostic apparatus according to the eighth embodiment, the scanning determination unit 36C of the ultrasound probe 1G determines whether or not the ultrasound probe 1G is performing a scan on the basis of the detected value of the pressure obtained by the pressure sensor 15. The determination result by the scanning determination unit 36C is wirelessly transmitted from the probe-side wireless communication unit 13 to the HMD 2F, is received by the HMD-side wireless communication unit 21 of the HMD 2F, and is sent to the scanned region mask generation unit 37.

The visual field image C acquired by the camera 24 of the HMD 2F is input to each of the visual field image memory 40 and the scanning position detection unit 35, the visual field image C is stored in the visual field image memory 40, and the scanning position of the ultrasound probe 1G is detected by the scanning position detection unit 35.

The scanned region mask M is generated by the scanned region mask generation unit 37 on the basis of the visual field image C acquired by the camera 24 or the visual field image C stored in the visual field image memory 40, the scanning position detected by the scanning position detection unit 35, and the determination result as to whether or not the ultrasound probe 1G is performing a scan, which is input via the HMD-side wireless communication unit 21 and is determined by the scanning determination unit 36, and the scanned region mask M is displayed on the HMD-side monitor 23 via the display control unit 22.

Even in a case where the scanning determination unit 36C of the ultrasound probe 1G determines whether or not the ultrasound probe 1G is performing a scan on the basis of the detected value of the pressure obtained by the pressure sensor 15 as in the ultrasound diagnostic apparatus according to the eighth embodiment, it is possible to display the scanned region mask M on the HMD-side monitor 23 of the HMD 2F, and it is possible for the user to check the scanned region without looking away from the subject T and the ultrasound probe 1G, as in the sixth and seventh embodiments.

Note that a configuration can be made in which the ultrasound probes 1E, 1F, and 1G or the HMDs 2E and 2F in the ultrasound diagnostic apparatuses of the sixth to eighth embodiments include the region determination unit 44 in the second embodiment illustrated in FIG. 9, the ultrasound image generated by the image generation unit 32 is analyzed, the pressure ulcer region R1 and the edema region R2 in the wound S of the subject T are determined, and the determined pressure ulcer region R1 and edema region R2 are displayed on the HMD-side monitor 23 by being superimposed on the scanned region mask M as illustrated in FIG. 14.

A configuration can also be made in which the HMDs 2E and 2F in the ultrasound diagnostic apparatuses of the sixth to eighth embodiments include the positional relationship determination unit 45 and the notification unit 46 in the third embodiment illustrated in FIG. 15, and a notification is issued to the user in a case where the current scanning position by the ultrasound probes 1E, 1F, and 1G excessively overlaps the scanned region indicated by the scanned region mask M or a gap that has not been scanned is generated between the current scanning position and the scanned region indicated by the scanned region mask M.

A configuration can also be made in which the ultrasound probes 1E, 1F, and 1G in the ultrasound diagnostic apparatuses of the sixth to eighth embodiments include the angle sensor 16 in the fifth embodiment illustrated in FIG. 19, the ultrasound probes 1E, 1F, and 1G or the HMDs 2E and 2F include the probe angle determination unit 47 and the notification unit 48 in the fifth embodiment illustrated in FIG. 19, and a notification is issued to the user in a case where the angle of the ultrasound probes 1E, 1F, and 1G is changed by a predetermined threshold value or more.

The first to eighth embodiments described above have been described using the pressure ulcer as an example, but the present invention is not limited thereto, and can be applied to the edema or the like that is a kind of phlebitis.

EXPLANATION OF REFERENCES 1, 1C, 1D, 1E, 1F, 1G: ultrasound probe
2, 2E, 2F: HMD
3, 3A, 3B, 3C, 3D: diagnostic apparatus main body
11: transducer array
12: transmission and reception circuit
13: probe-side wireless communication unit
14, 14C, 14D, 14E, 14F, 14G: probe control unit
15: pressure sensor
16: angle sensor
17E, 17F, 17G: probe-side processor
21: HMD-side wireless communication unit
22: display control unit
23: HMD-side monitor
25, 25E, 25F: HMD control unit
26E, 26F: HMD-side processor
31: main body-side wireless communication unit
32: image generation unit
33: display control unit
34: main body-side monitor
35: scanning position detection unit
36, 36C: scanning determination unit
37: scanned region mask generation unit
38: memory control unit
39: ultrasound image memory
40: visual field image memory
41, 41A, 41B, 41C, 41D: main body control unit
42: input unit
43, 43A, 43B, 43C, 43D: main body-side processor
44: region determination unit
45: positional relationship determination unit
46, 48: notification unit
47: probe angle determination unit
51: pulser
52: amplification unit
53: AD conversion unit
54: beam former
55: signal processing unit
56: DSC
57: image processing unit
U: temple portion
B: bridge portion
F: imaging lens
D: housing portion
M, M1, M1A, M2: scanned region mask
C, C1, C2: visual field image
T: subject
S: wound
V: movement amount
P, P2: scanning position
A1 to A4: pattern
R1: pressure ulcer region
R2: edema region
MR: scanned region
K: overlapping portion
W1, W2: width

What is claimed is:

1. An ultrasound diagnostic apparatus comprising:
an ultrasound probe;
a head-mounted display;
a processor; and
a diagnostic apparatus main body that is connected to the ultrasound probe and the head-mounted display and has a main body-side monitor,
wherein the head-mounted display includes a camera that acquires a visual field image including the ultrasound probe that is in contact with a body surface of a subject, and a head-mounted display-side monitor,
wherein the processor is configured to:
determine whether or not the ultrasound probe is performing a scan to obtain a determination result,
detect a scanning position of the ultrasound probe by analyzing the visual field image,
generate a scanned region mask indicating a region on the body surface of the subject that has already been scanned by the ultrasound probe on the basis of the visual field image, the determination result as to whether the ultrasound probe is performing a scan, and the detected scanning position, and
display the scanned region mask on the head-mounted display-side monitor,
wherein the processor is further configured to:
generate an ultrasound image by the ultrasound probe performing a scan along the body surface of the subject, and
store the ultrasound image in association with the scanning position detected by the processor, and
wherein the processor is further configured to, in response to a user designating a position on the visual field image matching with the scanning position displayed on the main body-side monitor, display the ultrasound image stored with the scanning position matching the designated position on the main body-side monitor.

2. The ultrasound diagnostic apparatus according to claim 1, wherein the processor is included in the diagnostic apparatus main body.

3. The ultrasound diagnostic apparatus according to claim 1, wherein the processor is included in the head-mounted display.

4. The ultrasound diagnostic apparatus according to claim 1,
wherein the processor includes
a first processor that determines whether or not the ultrasound probe is performing a scan to obtain the determination result, and
a second processor that detects the scanning position of the ultrasound probe by analyzing the visual field image, generates the scanned region mask indicating the scanned region on the basis of the visual field image, the determination result by the first processor, and the detected scanning position, and displays the scanned region mask on the head-mounted display-side monitor,
the first processor is included in the ultrasound probe, and a remaining part of the second processor is included in the head-mounted display.

5. The ultrasound diagnostic apparatus according to claim 1, wherein the processor determines whether or not the ultrasound probe is performing a scan by analyzing the ultrasound image.

6. The ultrasound diagnostic apparatus according to claim 1, wherein the processor determines whether or not the ultrasound probe is performing a scan by analyzing the visual field image.

7. The ultrasound diagnostic apparatus according to claim 1, wherein the ultrasound probe includes a pressure sensor, and the processor determines whether or not the ultrasound probe is performing a scan on the basis of a pressure detected by the pressure sensor.

8. The ultrasound diagnostic apparatus according to claim 1, wherein the processor determines that the ultrasound probe is performing a scan in a case where the user has input to perform a scan of the ultrasound probe.

9. The ultrasound diagnostic apparatus according to claim 1, wherein the processor detects the scanning position by recognizing a distal end portion of the ultrasound probe in the visual field image.

10. The ultrasound diagnostic apparatus according to claim 1, wherein the processor is further configured to convert, on the basis of movement between the visual field image of a previous frame and the visual field image of a current frame, the scanned region mask in the previous frame generated by the processor, and add the detected scanning position to generate the scanned region mask in the current frame.

11. The ultrasound diagnostic apparatus according to claim 1, wherein the processor is further configured to determine a pressure ulcer region and an edema region in a wound by analyzing the ultrasound image and display, on the head-mounted display-side monitor, body surface portions of the subject corresponding to the determined pressure ulcer region and the determined edema region.

12. The ultrasound diagnostic apparatus according to claim 1, wherein the processor is further configured to:
determine a positional relationship between the detected scanning position and the scanned region indicated by the scanned region mask, and
to issue a notification to the user in a case where it is determined by the processor that the scanning position overlaps the scanned region by a width exceeding a predetermined threshold value or a gap is generated between the scanning position and the scanned region.

13. The ultrasound diagnostic apparatus according to claim 1, wherein the ultrasound probe includes an angle sensor that detects an angle of the ultrasound probe, and the processor is configured to issue a notification to the user in a case where the angle of the ultrasound probe detected by the angle sensor is changed by a predetermined threshold value or more during the scan of the ultrasound probe.

14. The ultrasound diagnostic apparatus according to claim 1, wherein the head-mounted display-side monitor is a transparent monitor arranged in a visual field of the head-mounted display such that the ultrasound probe that performs a scan along the body surface of the subject is directly viewable by the user through the head-mounted display-side monitor.

15. The ultrasound diagnostic apparatus according to claim 1, wherein the visual field image is displayed on the head-mounted display-side monitor, and
the scanned region mask is displayed on the head-mounted display-side monitor by being superimposed on the visual field image.

16. The ultrasound diagnostic apparatus according to claim 5, wherein the processor is further configured to determine a pressure ulcer region and an edema region in a wound by analyzing the ultrasound image, and display, on the head-mounted display-side monitor, body surface portions of the subject corresponding to the determined pressure ulcer region and the determined edema region.

17. An ultrasound diagnostic apparatus comprising:
an ultrasound probe;
a head-mounted display;
a processor; and
a diagnostic apparatus main body that is connected to the ultrasound probe and the head-mounted display and has a main body-side monitor,
wherein the head-mounted display includes a camera that acquires a visual field image including the ultrasound probe that is in contact with a body surface of a subject, and a head-mounted display-side monitor,
wherein the processor is configured to:
generate an ultrasound image from data received with the ultrasound probe,
determine whether or not the ultrasound probe is performing a scan by analyzing the ultrasound image to obtain a determination result,
wherein in a case where the ultrasound probe is determined to be performing a scan,
the processor is further configured to:

detect a scanning position of the ultrasound probe by analyzing the visual field image, generate a scanned region mask indicating a region on the body surface of the subject that has already been scanned by the ultrasound probe on the basis of the visual field image, the determination result as to whether the ultrasound probe is performing a scan, and the detected scanning position, and display the scanned region mask on the head-mounted display-side monitor, wherein the processor is further configured to store the ultrasound image is stored in association with the scanning position detected by the processor, and wherein the processor is further configured to, in response to a user designating a position on the visual field image matching with the scanning position displayed on the main body-side monitor, display the ultrasound image stored with the scanning position matching the designated position on the main body-side monitor.

* * * * *